United States Patent
Koyama et al.

(10) Patent No.: US 12,253,598 B2
(45) Date of Patent: Mar. 18, 2025

(54) OBJECT DETECTION DEVICE

(71) Applicant: DENSO CORPORATION, Kariya (JP)

(72) Inventors: Yu Koyama, Nisshin (JP); Tetsuya Aoyama, Kariya (JP)

(73) Assignee: DENSO CORPORATION, Kariya (JP)

(*) Notice: Subject to any disclaimer, the term of this patent is extended or adjusted under 35 U.S.C. 154(b) by 31 days.

(21) Appl. No.: 18/450,248

(22) Filed: Aug. 15, 2023

(65) Prior Publication Data

US 2024/0036195 A1 Feb. 1, 2024

Related U.S. Application Data

(63) Continuation of application No. PCT/JP2022/000769, filed on Jan. 12, 2022.

(30) Foreign Application Priority Data

Feb. 16, 2021 (JP) .................. 2021-022688

(51) Int. Cl.
*G01S 15/931* (2020.01)
*G01S 7/534* (2006.01)

(52) U.S. Cl.
CPC ............ *G01S 15/931* (2013.01); *G01S 7/534* (2013.01)

(58) Field of Classification Search
CPC ........ G01S 15/931; G01S 7/534; G01S 7/539; G01S 15/32; G01S 2015/932; G01S 2015/938

USPC ........................................................ 367/93

See application file for complete search history.

(56) References Cited

U.S. PATENT DOCUMENTS

2021/0311190 A1 10/2021 Koyama et al.
2023/0305143 A1* 9/2023 Koyama ................. G01S 7/536

* cited by examiner

*Primary Examiner* — Eric Blount
(74) *Attorney, Agent, or Firm* — Maschoff Brennan

(57) ABSTRACT

An object detection device includes a drive signal generator that generates a drive signal including frequency modulation, a first correlation filter that performs correlation detection between the reception signal and a first reference signal corresponding to the drive signal, a first determiner that determines, based on the correlation signal from the first correlation filter, whether the reception signal is a reflected wave of the probe wave transmitted from the transmitter, a second correlation filter that performs correlation detection between the reception signal and a second reference signal corresponding to a portion of the drive signal, a third correlation filter that performs correlation detection between the reception signal and a third reference signal corresponding to another portion of the drive signal having higher frequencies than the second reference signal, and a second determiner that determines whether there is an object within a detection region based on correlation signals from the second and third correlation filters.

7 Claims, 22 Drawing Sheets

FIG.3
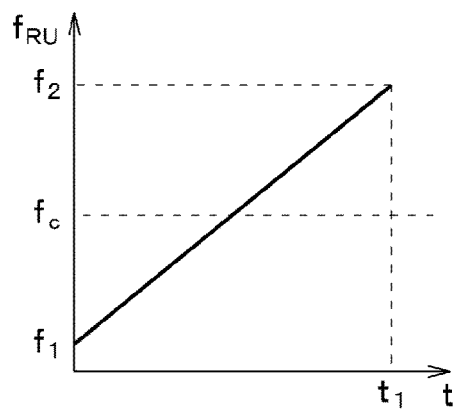
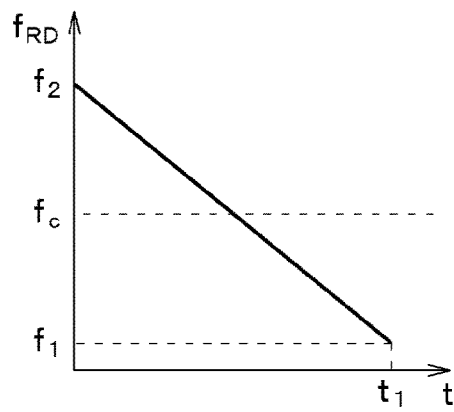
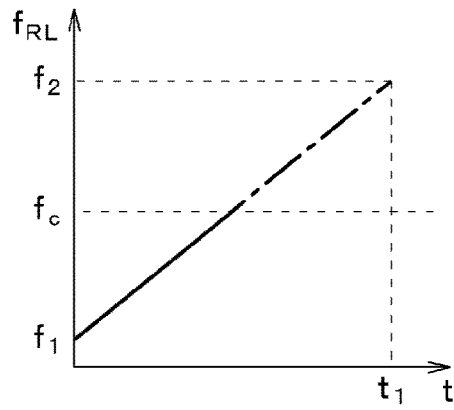
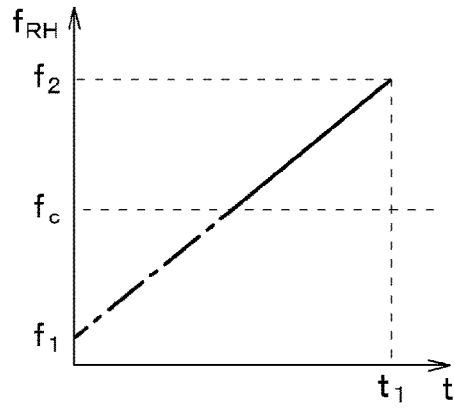

FIG.24
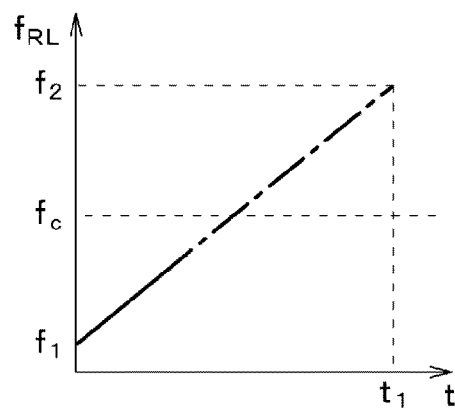
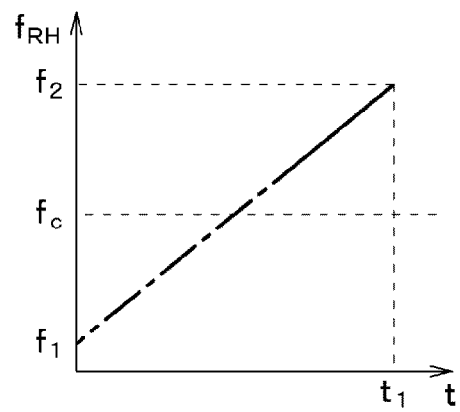
FIG.25
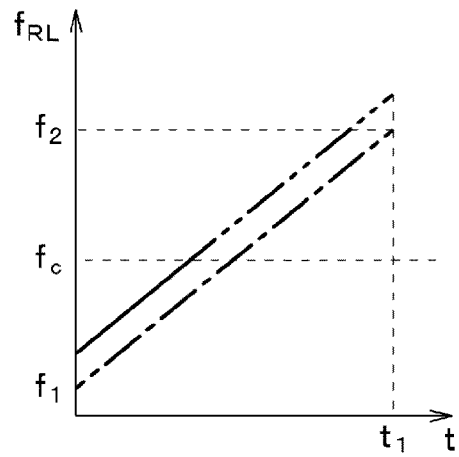
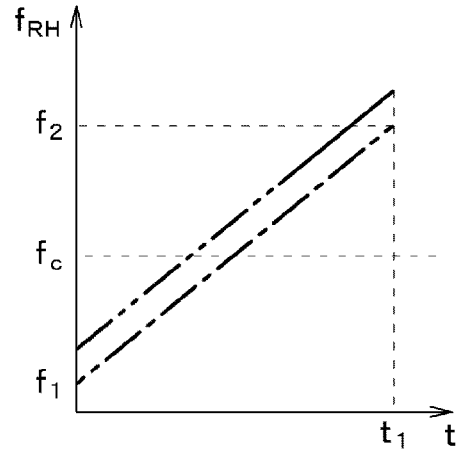

FIG.28
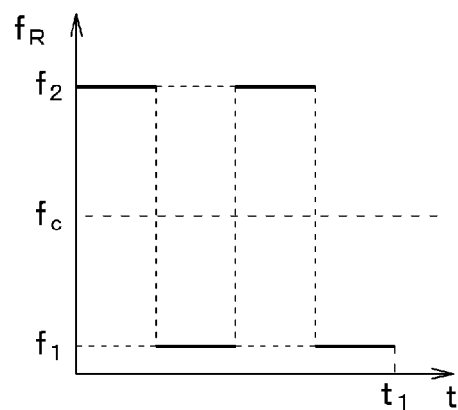
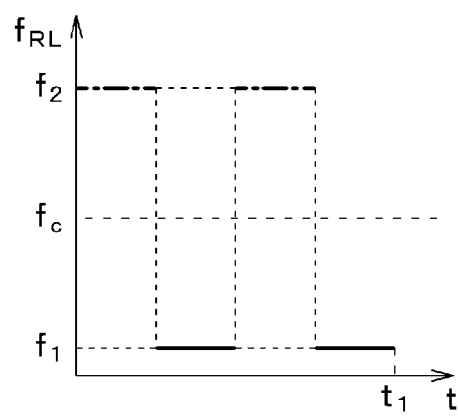
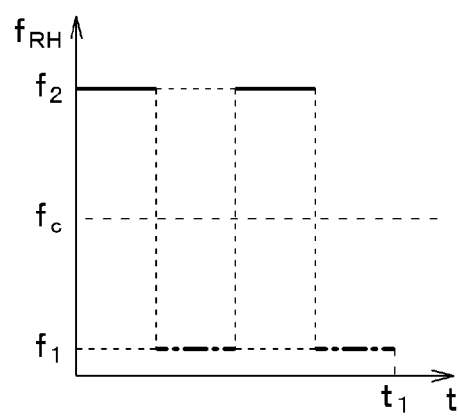

FIG.29
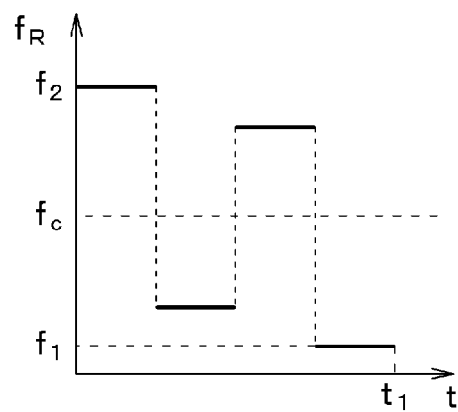
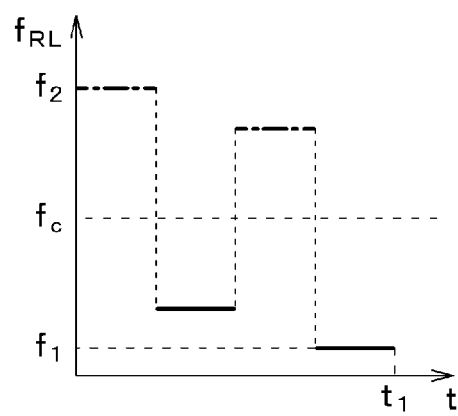
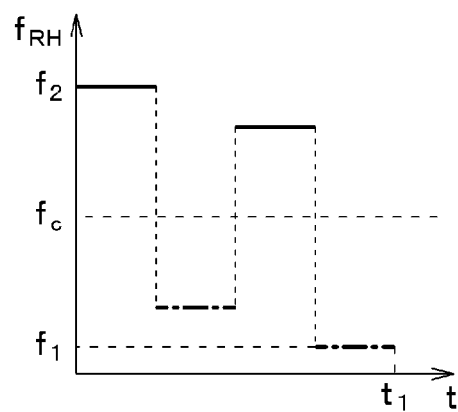

OBJECT DETECTION DEVICE

CROSS-REFERENCE TO RELATED APPLICATION

This application is a continuation application of International Application No. PCT/JP2022/000769 filed Jan. 12, 2022 which designated the U.S. and claims priority to Japanese Patent Application No. 2021-022688 filed on Feb. 16, 2021, the contents of each of which are incorporated herein by reference.

BACKGROUND

Technical Field

This disclosure relates to an object detection device for detecting an object by transmitting and receiving ultrasonic waves.

Related Art

In an automatic parking system for a vehicle, such as an automobile, obstacle detection is performed by a plurality of ultrasonic sensors attached to the bumper of the vehicle. To improve the accuracy of such an automatic parking system, it is desirable to make a determination as to whether there is an obstacle within a detection region. This determination is, for example, a determination as to whether the object is a tall object that is likely to come into contact with the vehicle body.

For example, a technique for determining the height of an object using the difference in directivity between frequencies is known. Specifically, an ultrasonic wave having high and low frequencies is transmitted as a probe wave, and amplitude components of two frequencies are extracted from the reception signal using a bandpass filter. Since an ultrasonic wave having a higher frequency has a narrower directivity than an ultrasonic wave having a lower frequency, the height of an object can be determined by comparing the amplitudes of the two frequencies.

BRIEF DESCRIPTION OF THE DRAWINGS

In the accompanying drawings:

FIG. 3 is an illustration of frequencies of reference signals;

FIG. 24 is an illustration of frequencies of reference signals according to a fifth embodiment;

FIG. 25 is an illustration of frequencies of reference signals according to another embodiment;

FIG. 28 is an illustration of frequencies of reference signals according to another embodiment; and FIG. 29 is an illustration of frequencies of reference signals according to another embodiment.

DESCRIPTION OF SPECIFIC EMBODIMENTS

Figure 1:
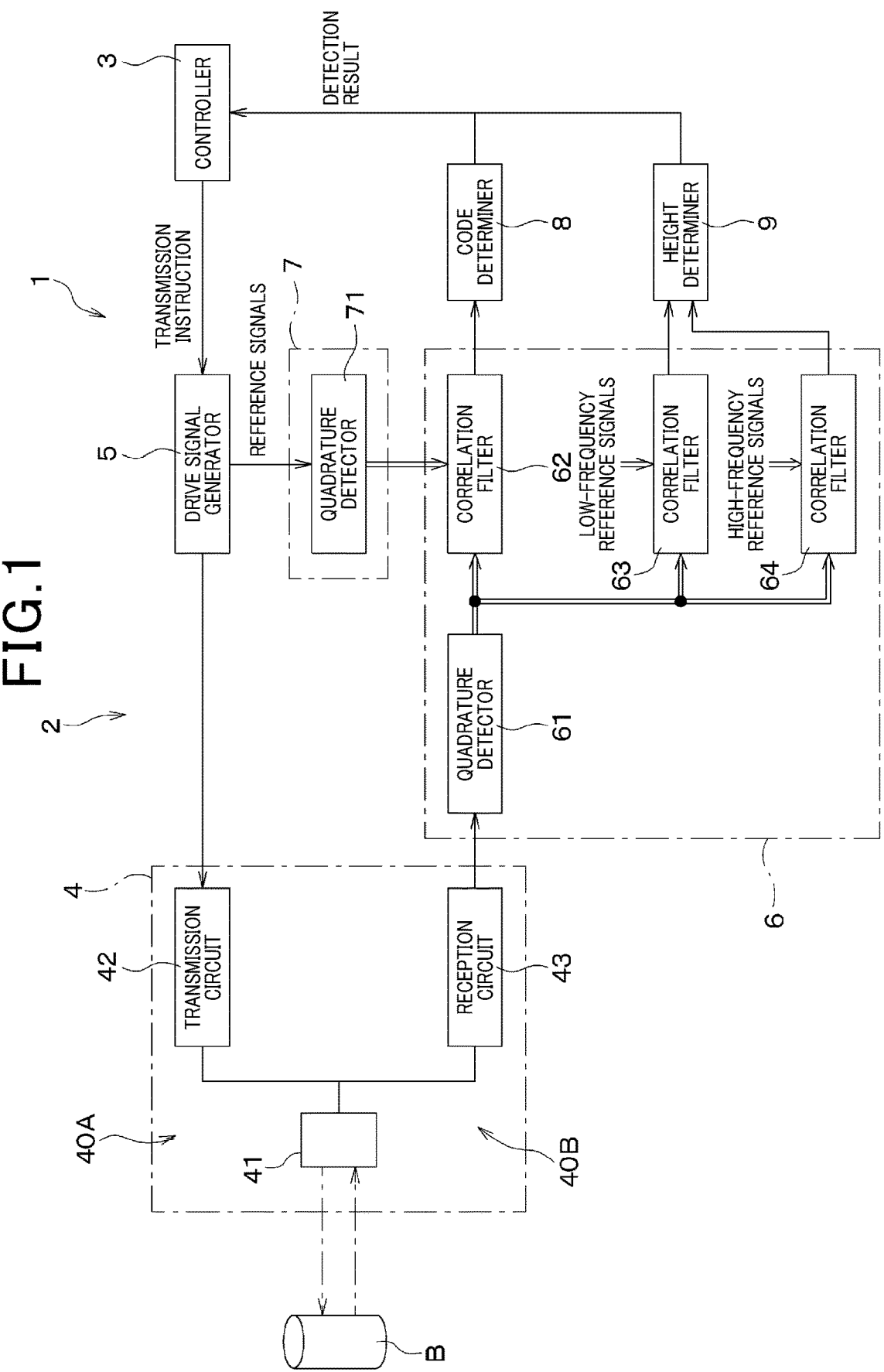
FIG. 1 is a block diagram of an object detection device according to a first embodiment.

An object detection device according to the above known technique, as disclosed in JP 2020-98157 A, does not have a function to prevent inter-sensor interference. Thus, when the frequency of transmission of probe waves is increased, or when a vehicle is running opposite or parallel to another vehicle and receives transmission waves from the other vehicle, the height of the object may not be correctly determined due to interference.

One method to prevent interference is, for example, to encode the probe wave by modulating the frequency of the probe wave and then determine whether codes match between the transmission signal and the reception signal, that is, whether the features of the frequency modulation match between the transmission signal and the reception signal.

In such a case where reception signals are identified by codes, if the signal for code identification and the signal for height determination are transmitted separately, the number of probe wave transmissions required for one object detection process increases, thus leading to a reduction in the frequency of performing the object detection process and deterioration of the object detection performance.

In view of the foregoing, it is desired to have an object detection device capable of identifying a received wave and determining whether there is an object within a detection region with a single transmission/reception.

According to one aspect of the present disclosure, an object detection device for detecting an object by transmitting and receiving ultrasonic waves, includes: a transmitter that transmits an ultrasonic wave as a probe wave; a drive signal generator that generates a drive signal, including frequency modulation, to drive the transmitter; a receiver that receives the ultrasonic wave and generates a reception signal according to the received ultrasonic wave; a first correlation filter that performs correlation detection between the reception signal and a first reference signal corresponding to the drive signal and outputs a correlation signal; a first determiner that determines, based on the correlation signal output from the first correlation filter, whether the ultrasonic wave received by the receiver is a reflected wave of the probe wave transmitted from the transmitter; a second correlation filter that outputs a correlation signal by performing correlation detection between the reception signal and a second reference signal, the second reference signal being a signal corresponding to a portion of the drive signal; a third correlation filter that outputs a correlation signal by performing correlation detection between the reception signal and a third reference signal, the third reference signal being a signal corresponding to another portion of the drive signal having higher frequencies than the second reference signal; and a second determiner that determines whether there is an object within a detection region based on the correlation signal output from the second correlation filter and the correlation signal output from the third correlation filter.

As described above, a reception signal is identified by correlation detection using the first reference signal corresponding to the drive signal. An object detection determination is made as to whether there is an object within the detection region by correlation detection using the second reference signal that corresponds to a portion of the driving signal and the third reference signal that includes another portion of the driving signal that has frequencies higher than the second reference signal. Therefore, with a single transmission/reception, the received wave can be identified and an object detection determination as to whether there is an object within the detection region can be made.

Hereinafter, embodiments of the present disclosure will be described with reference to the accompanying drawings. In the following embodiments, the same or equivalent parts are assigned with the same reference numerals in the drawings, and the same description is adopted for parts with the same reference numerals.

First Embodiment

A first embodiment will now be described. An object detection device 1 of the present embodiment illustrated in FIG. 1 is mounted to a vehicle which is not shown in the figure, and is configured to detect an object B around the vehicle. The vehicle carrying the object detection device 1 is hereinafter referred to as an "own vehicle". The vehicle (not shown) is, for example, an automobile.

The object detection device 1 includes, for detecting an object by transmitting and receiving ultrasonic waves, an ultrasonic sensor 2 and a controller 3 that controls the operation of the ultrasonic sensor 2. The ultrasonic sensor 2 is configured to detect an object B by transmitting probe waves which are ultrasonic waves, and receiving reflected waves of the probe waves by the object B.

The ultrasonic sensor 2 includes a transceiver 4, a drive signal generator 5, a reception signal processor 6, a reference signal processor 7, a code code determiner 8, and a height determiner 9. The transceiver 4 includes a transmission section 40A and a reception section 40B. The transmission section 40A is provided to enable transmission of probe waves to the outside. The reception section 40B is provided to receive ultrasonic waves, including reflected waves by the object B, of the probe waves transmitted from the transmission section 40A.

The transceiver 4 includes a transducer 41, a transmission circuit 42, and a reception circuit 43. The transmitter section 40A is formed of the transducer 41 and the transmission circuit 42. The reception section 40B is formed of the transducer 41 and the reception circuit 43.

The transducer 41 serves as a transmitter to transmit the probe waves to the outside and as a receiver to receive the reflected waves, and is electrically connected to the transmission circuit 42 and the reception circuit 43. That is, the ultrasonic sensor 2 has a so-called integrated transmitter/receiver configuration.

Specifically, the transducer 41 is configured as an ultrasonic microphone with a built-in electrical-mechanical energy conversion element, such as a piezoelectric element. The transducer 41 is disposed in a position facing the outer surface of the own vehicle so as to be capable of transmitting probe waves to the outside of the own vehicle and receiving reflected waves from the outside of the own vehicle.

The transmission circuit 42 is provided to drive the transducer 41 based on the transmission signal received, thereby causing this transducer 41 to transmit a probe wave. Specifically, the transmission circuit 42 includes a digital-to-analog conversion circuit and the like. That is, the transmission circuit 42 is configured to generate an element input signal by applying signal processing such as digital-to-analog conversion to the drive signal output from the drive signal generator 5. The element input signal is an AC voltage signal to drive the transducer 41. The transmission circuit 42 is configured to apply the generated element input signal to the transducer 41 to excite the electro-mechanical energy conversion element in the transducer 41, thereby generating a probe wave.

The reception circuit 43 is provided to generate a reception signal corresponding to the result of reception of the ultrasonic wave by the transducer 41 and output it to the reception signal processor 6. Specifically, the reception circuit 43 includes an amplification circuit and an analog-to-digital conversion circuit. That is, the reception circuit 43 is configured to apply signal processing such as amplification and analog-to-digital conversion to the element output signal output by the transducer 41 to thereby generate a reception signal that includes information on the amplitude and frequency of the received wave. The element output signal is an AC voltage signal generated by the electrical-mechanical energy conversion element in the transducer 41 through reception of the ultrasonic wave.

As described later, the probe wave includes an ultrasonic wave encoded by frequency modulation. The center frequency of the frequency modulation band of the probe wave is $f_c$, and the sampling frequency of the reception circuit 43 is at least twice $f_c$. The sampling frequency of the reception signal may be the same as or different from the sampling frequency of the drive signal.

The drive signal generator 5 is configured to generate a drive signal and output it to the transmission circuit 42. The drive signal is a signal for driving the transducer 41 to cause the transducer 41 to transmit a probe wave.

The drive signal generator 5 is configured to generate a drive signal corresponding to a frequency modulation state of the probe wave among predefined frequency modulation states. The drive signal generator 5 generates the drive signal such that the frequency of the probe wave is swept in a range including a resonant frequency of the transducer 41.

In the present embodiment, the predefined frequency modulation states include an up-chirp or down-chirp. The up-chirp is a frequency modulation state such that the frequency increases monotonically with time. The down-chirp is a frequency modulation state such that the frequency decreases monotonically with time.

The probe wave is encoded by frequency modulation of the driving signal. For example, the up-chirp indicates the code "1" and the down-chirp indicates the code "0". These codes are used to identify the received waves.

The drive signal generator 5, the reception signal processor 6, the reference signal processor 7, the code determiner 8, and the height determiner 9 may be configured, for example, as a Digital Signal Processor (DSP) having functions programmed, such as the above-described drive signal generation, as well as quadrature detection, correlation calculation, code determination, height determination, and the like as described later.

The reception signal processor 6 processes the reception signal and performs correlation detection between the reception signal and a reference signal. The reception signal processor 6 includes a quadrature detector 61, a correlation filter 62, a correlation filter 63, and a correlation filter 64.

Figure 2:
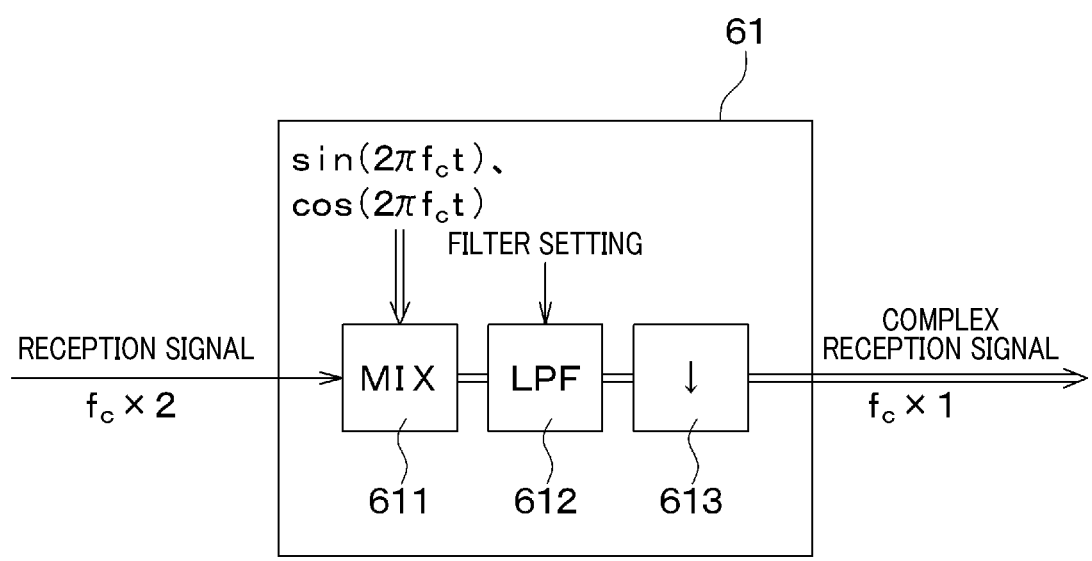
FIG. 2 is a block diagram of a quadrature detector included in a reception signal processor.

The quadrature detector 61 generates a complex signal based on quadrature detection of the reception signal output from the reception circuit 43. As illustrated in FIG. 2, the quadrature detector 61 includes a multiplier 611, a low-pass filter (LPF) 612, and a down-sampler 613. The low-pass filter 612 is hereafter abbreviated as LPF 612.

The multiplier 611 multiplies the reception signal output from the reception circuit 43 by $\sin(2\pi f_c t)$ and $\cos(2\pi f_c t)$ to generate a complex signal. Here, t is time. The signals $\sin(2\pi f_c t)$ and $\cos(2\pi f_c t)$ are input from the drive signal generator 5 to the multiplier 611. The multiplier 611 outputs the generated complex signal to the LPF 612.

The LPF 612 removes high frequency components from the complex signal output from the multiplier 611. The cut-off frequency of the LPF 612 is received from the controller 3 and is set based on the bandwidth of the transducer 41 and the sweep band of the drive signals. The complex signal having the high-frequency components removed by the LPF 612 is input to the down-sampler 613.

The down-sampler 613 down-samples the output signal from the LPF 612. The down-sampler 613, for example, down-samples the signal sampled at twice the center frequency $f_c$ to one times the center frequency $f_c$. The sampling frequency after down-sampling may be set lower than one times the center frequency $f_c$ according to the cut-off frequency of the LPF 612.

The output signal of the down-sampler 613 is input to the correlation filters 62, 63, and 64. The complex signal output from the down-sampler 613 is a complex reception signal. The complex reception signal consists of N signals sampled by the down-sampler 613. N is an integer greater than or equal to 2. The N signals forming the complex reception signal are denoted as signals $S_1$ to $S_N$ in the order in which they were sampled.

Each of the correlation filters 62, 63, and 64 performs correlation detection between the complex reception signal generated by the quadrature detector 61 and each of reference signals corresponding respectively to the up-chirp and the down-chirp, and outputs a correlation signal. The reference signals used by the correlation filters 62, 63, and 64 are referred to as first reference signals, second reference signals, and third reference signals, respectively. The correlation filter 62, the correlation filter 63, and the correlation filter 64 correspond to a first correlation filter, a second correlation filter, and a third correlation filter, respectively.

The first reference signal corresponds to the drive signal and include the same frequency modulation as the drive signal. The second and third reference signals correspond to portions of the drive signal. The second reference signal contains a portion of the drive signal that has lower frequencies than the third reference signal, and the third reference signal contains a portion of the drive signal that has higher frequencies than the second reference signal. In the present embodiment, the second and third reference signals are portions of the first reference signal.

The correlation signal output from the correlation filter 62 is input to the code determiner 8. The correlation signals output from the correlation filters 63 and 64 are input to the height determiner 9. Details of the correlation filters 62, 63, and 64 will be described later.

FIG. 3 illustrates an example of reference signals. $f_{RU}$ is the frequency of the first reference signal corresponding to the up-chirp, sweeping from a frequency $f_1$ lower than the center frequency $f_c$ to a frequency $f_2$ higher than the center frequency $f_c$ during time $t_1$. $f_{RD}$ is the frequency of the first reference signal corresponding to the down-chirp, sweeping from $f_2$ to $f_1$ during time $t_1$.

$f_{RL}$ is the frequency of the second reference signal, which is the portion of the first reference signal corresponding to the up-chirp whose frequency is lower than $f_c$. $f_{RH}$ is the frequency of the third reference signal, which is the portion of the first reference signal corresponding to the up-chirp whose frequency is higher than or equal to $f_c$. In the figures for $f_{RL}$ and $f_{RH}$, the solid lines indicate the portions of the first reference signal that are used as the second and third reference signals, and the dashed-dotted lines indicate the portions of the first reference signal that are excluded from the second and third reference signals. Thus, the second and third reference signals are the first half and the second half of the first reference signal corresponding to the up-chirp, respectively.

The present embodiment will now be described for the case where such reference signals are used. In FIG. 3, the second and third reference signals are shown when the probe wave contains an up-chirp. When the probe wave contains a down-chirp, the second and third reference signals are the second half and the first half of the first reference signal corresponding to the down-chirp, respectively.

The reference signal processor 7 processes signals output from the drive signal generator 5 and outputs them to the reception signal processor 6. The signals output from the drive signal generator 5 to the reference signal processor 7 correspond to the up-chirp and down-chirp used for the drive signal to be input to the transceiver 4, where these signals are reference signals for identifying the code of the reception signal. The drive signal generator 5 outputs the reference signal corresponding to the up-chirp and the reference signal corresponding to the down-chirp to the reference signal processor 7. In the reception signal processor 6, the reference signals processed by the reference signal processor 7 are used for correlation detection. As illustrated in FIG. 1, the reference signal processor 7 includes a quadrature detector 71.

Figure 4:
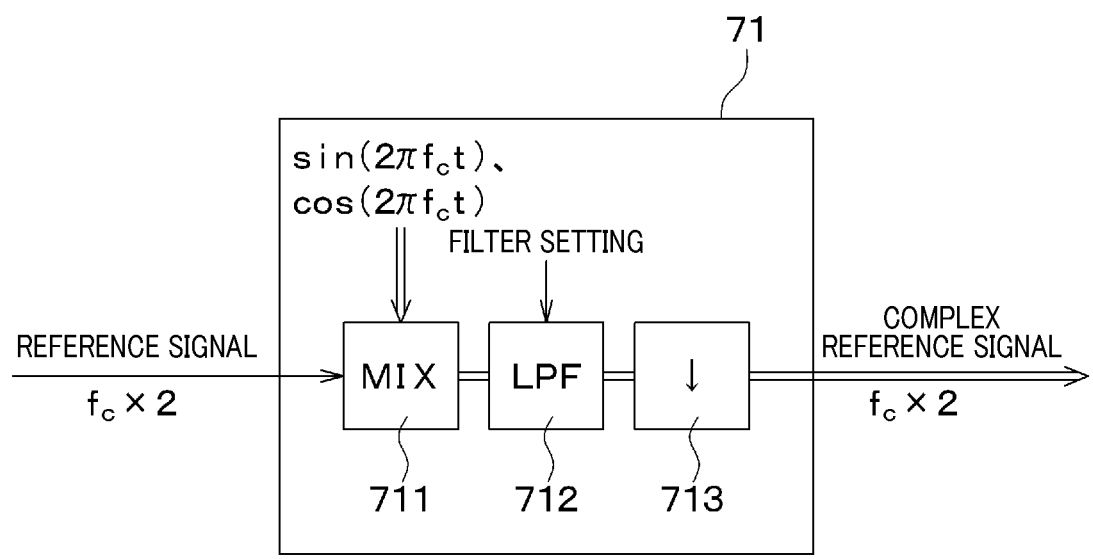
FIG. 4 is a block diagram of a quadrature detector included in a reference signal processor.

The quadrature detector 71 generates a complex signal based on quadrature detection of the reference signal output from the drive signal generator 5. As illustrated in FIG. 4, the quadrature detector 71 includes a multiplier 711, an LPF 712, and a down-sampler 713. The multiplier 711, the LPF 712, and the down-sampler 713 have the same configuration as the multiplier 611, LPF 612, and down-sampler 613 of the quadrature detector 61.

That is, the multiplier 711 multiplies the reference signal by each of $\sin(2\pi f_c t)$ and $\cos(2\pi f_c t)$ to generate a complex signal, and the LPF 712 removes high-frequency components from the complex signal output from the multiplier 711. The down-sampler 713 down-samples the output signal of the LPF 712.

The down-sampler 713 performs down-sampling such that the sampling frequency after down-sampling for the reference signal is the same as the sampling frequency after down-sampling for the reception signal. That is, for example, if the input signal is down-sampled at one times the center frequency $f_c$ in the down-sampler 613, the input signal is also down-sampled at one times the center frequency $f_c$ in the down-sampler 713.

The output signal of the down-sampler 713 is input to the correlation filters 62, 63, and 64. The complex signal output from the down-sampler 713 is a complex reference signal. The complex reference signal consists of N signals like the complex reception signal. The N signals forming the complex reference signal are the signals $SR_1$ to $SR_N$ in the order in which they are sampled. In the correlation filter 62, correlation detection is performed between the complex reception signal, which consists of signals $S_1$ to $S_N$, and the complex reference signal, which consists of signals $SR_1$ to $SR_N$.

As described above, in the correlation filters 63 and 64, portions of each first reference signal are used for correlation detection. Assume the case where the drive signal contains an up-chirp. In this case, the portions of the complex reference signal generated by quadrature detection of the first reference signal corresponding to the up-chirp, corresponding to the second and third reference signals, that is, the portion with a frequency lower than $f_c$ and the portion with a frequency higher than or equal to $f_c$, are input to the correlation filters 63 and 64, respectively. For example, when N is an even number, signals $SR_1$ to $SR_{N/2}$ are input to the correlation filter 63, and signals $SR_{N/2+1}$ to $SR_N$ are input to the correlation filter 64.

In the correlation filter 63, correlation detection is performed between a complex reception signal consisting of the signals $S_1$ to $S_{N/2}$ and a complex reference signal consisting of the signals $SR_1$ to $SR_{N/2}$. In the correlation filter 64, correlation detection is performed between a complex reception signal consisting of the signals $S_{N/2+1}$ to $S_N$ and a complex reference signal consisting of the signals $SR_{N/2+1}$ to $SR_N$.

Assume the case where the driving signal contains a down-chirp. In this case, the portions of the complex reference signal generated by quadrature detection of the first reference signal corresponding to the down-chirp, corresponding to the second and third reference signals, that is, the portion with a frequency lower than $f_c$ and the portion with a frequency higher than or equal to $f_c$, are input to the correlation filters 63 and 64, respectively. For example, when N is an even number, signals $SR_{N/2+1}$ to SR N are input to correlation filter 63, and signals $SR_1$ to $SR_{N/2}$ are input to correlation filter 64.

In the correlation filter 63, correlation detection is performed between a complex reception signal consisting of the signals $S_{N/2+1}$ to $S_N$ and a complex reference signal consisting of the signals $SR_{N/2+1}$ to $SR_N$. In the correlation filter 64, correlation detection is performed between a complex reception signal consisting of the signals $S_1$ to $S_{N/2}$ and a complex reference signal consisting of the signals $SR_1$ to $SR_{N/2}$.

Figure 5:
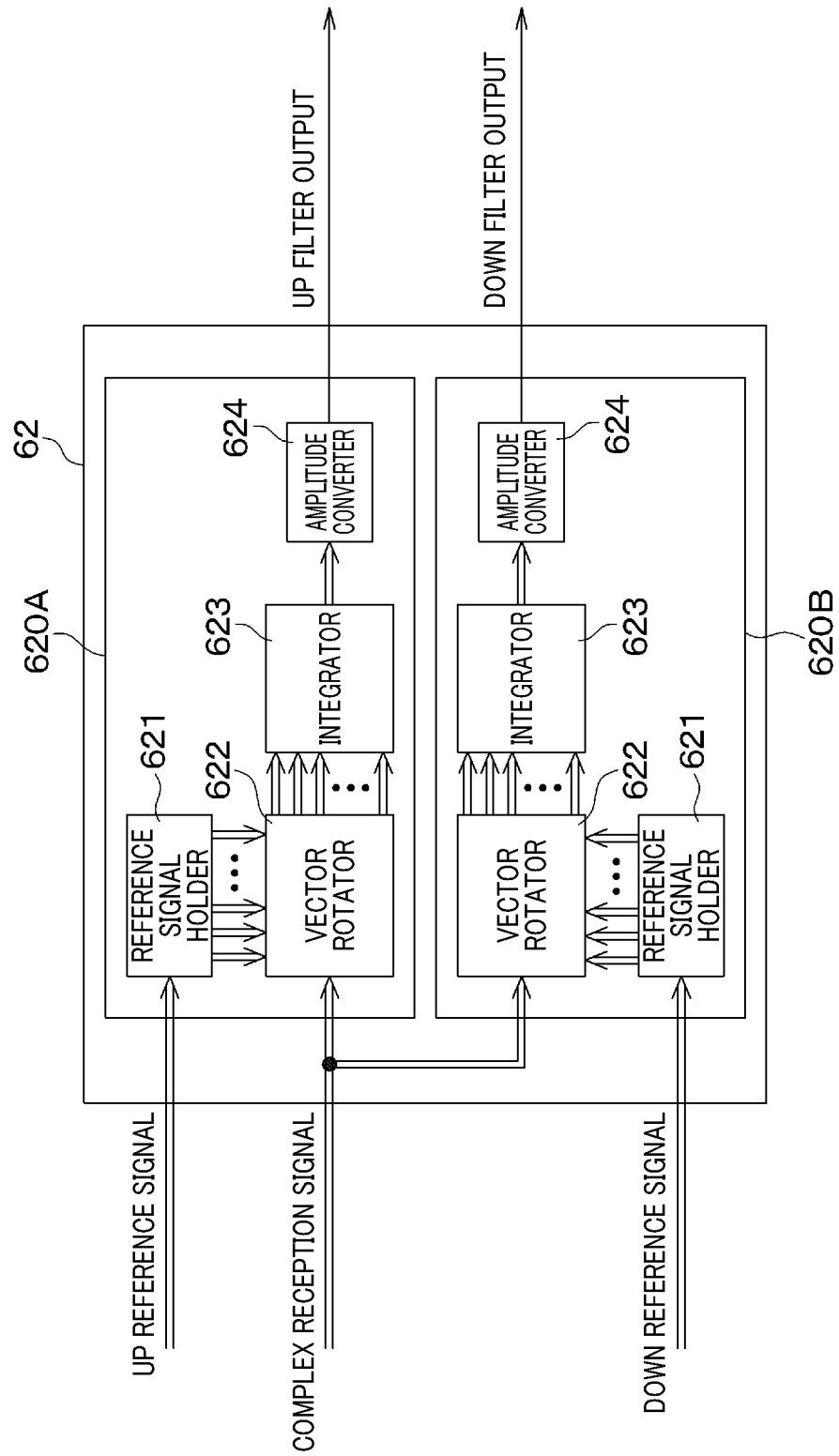
FIG. 5 is a block diagram of a correlation filter that uses a reference signal corresponding to a drive signal.

Details of the correlation filter 62 will now be described. As illustrated in FIG. 5, the correlation filter 62 includes an up-chirp filter 620A and a down-chirp filter 620B. The up-chirp filter 620A performs correlation detection between the complex reception signal and the complex reference signal for the up-chirp signal. The down-chirp filter 620B performs correlation detection between the complex reception signal and the complex reference signal for the down-chirp signal. There is a technique for performing correlation calculation in which the complex reception signals are vector rotated based on the reference signal and then summed. The up-chirp filter 620A includes a reference signal holder 621, a vector rotator 622, an integrator 623, and an amplitude converter 624.

Figure 6:
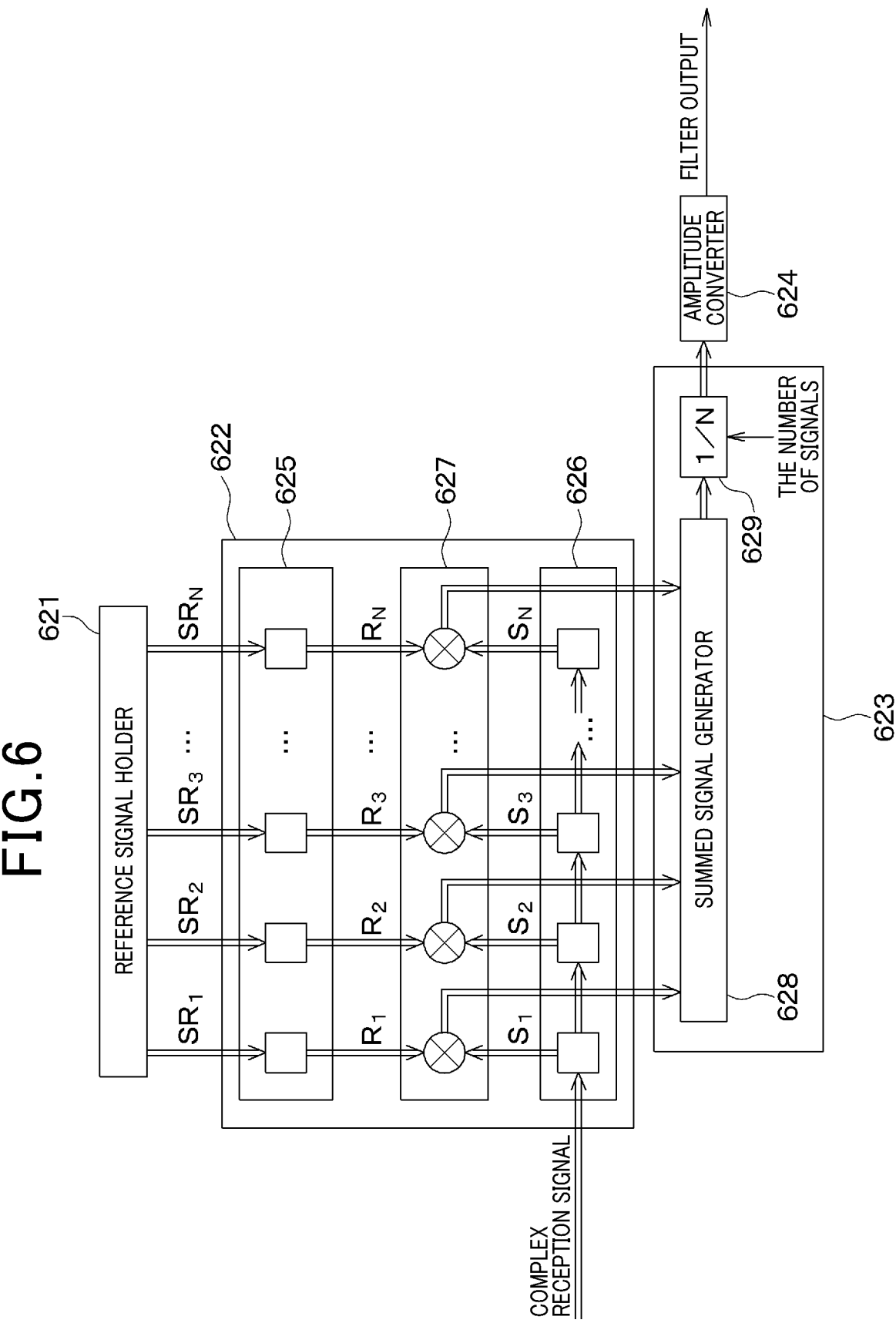
FIG. 6 is a block diagram of a vector rotator and an integrator included in the correlation filter.

The up-chirp filter 620A is configured to receive from the reference signal processor 7 the complex reference signal generated through quadrature detection of the reference signal corresponding to the up-chirp. The reference signal holder 621 is configured to hold and output the complex reference signal received from the reference signal processor 7, and output the plurality of signals forming the complex reference signal individually. Specifically, the reference signal holder 621 outputs the signals $SR_1$ to $SR_N$ output from the down-sampler 713 individually. The vector rotator 622 performs vector rotation of the received signal. As illustrated in FIG. 6, the vector rotator 622 includes a matrix converter 625, a reception signal holder 626, and a multiplier 627.

The matrix converter 625 converts the signals $SR_1$ to $SR_N$ output from the reference signal holder 621 into rotation matrices $R_1$ to $R_N$. Specifically, with the phase of signal $SR_1$ as $\theta_{R1}$, the rotation matrix $R_1$ is generated as follows.

$$R_1 = \begin{bmatrix} \cos\theta_{R1} & \sin\theta_{R1} \\ -\sin\theta_{R1} & \cos\theta_{R1} \end{bmatrix}$$

The rotation matrices $R_2$ to $R_N$ are generated in the same way using the phases $\theta_{R2}$ to $\theta_{RN}$ of the signals $SR_2$ to $SR_N$. The matrix converter 625 outputs the signals corresponding to the generated rotation matrices $R_1$ to $R_N$ individually to the multiplier 627.

The reception signal holder 626 holds the complex reception signal and outputs it to the multiplier 627. The reception signal holder 626 is configured to receive the complex reception signal from the quadrature detector 61, and the reception signal holder 626 outputs the received signals $S_1$ to $S_N$ individually to the multiplier 627.

Figure 7:
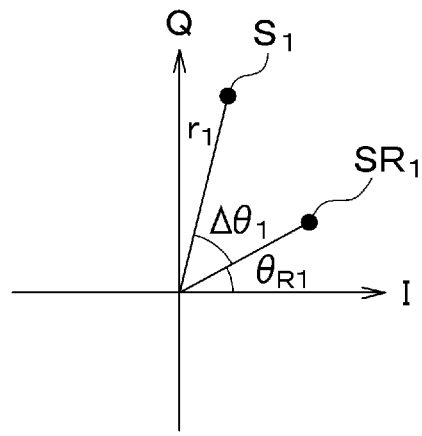
FIG. 7 is an illustration of a phase difference between a complex reception signal and a complex reference signal.
Figure 8:
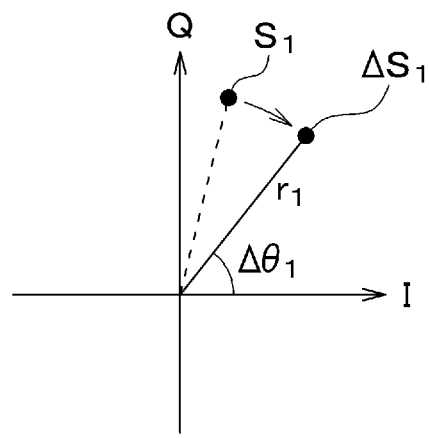
FIG. 8 is an illustration of vector rotation of a complex reception signal $S_1$.

The multiplier 627 calculates the correlation between the reception signal and the first reference signal, and corresponds to a first correlation calculator. Specifically, the multiplier 627 multiplies the rotation matrices $R_1$ to $R_N$ generated by the matrix converter 625 by the vectors of the signals $S_1$ to $S_N$ to generate signals $\Delta S_1$ to $\Delta S_N$ whose phase is the phase difference between the reception signal and the reference signal. For example, as illustrated in FIG. 7, with the phase difference between signal $S_1$ and signal $SR_1$ denoted by $\Delta\theta_1$ and the amplitude of signal $S_1$ denoted by $r_1$, the phase of signal $\Delta S_1$ is $\Delta\theta_1$ and the amplitude is $r_1$, as illustrated in FIG. 8. FIGS. 7 and 8, as well as FIGS. 9 through 12, show the signal $S_1$, etc., on the complex plane. With the real part of the signal $S_1$ denoted by $I_1$ and the imaginary part denoted by $Q_1$, and the real part of the signal $\Delta S_1$ denoted by $I_1'$ and the imaginary part denoted by $Q_1'$, then $I_1'$ and $Q_1'$ can be obtained according to the following relational expression.

$$\begin{bmatrix} I_1' \\ Q_1' \end{bmatrix} = R_1 \begin{bmatrix} I_1 \\ Q_1 \end{bmatrix}$$

Similarly, with phase differences between the signals $S_2$ and $SR_2$, between the signals $S_3$ and $SR_3$, ..., and between the signals $S_N$ and $SR_N$ denoted by $\Delta\theta_2$ to $\Delta\theta_N$, the amplitudes of the signals $S_2$ to $S_N$ are $r_2$ to $r_N$. From real parts $I_2'$ to $I_N'$ imaginary parts $Q_2'$ to $Q_N'$ and rotation matrices $R_2$ to $R_N$ of the signals $S_2$ to $S_N$, the real parts $I_2'$ to $I_N'$ and imaginary parts $Q_2'$ to $Q_N'$ of the signals $\Delta S_2$ to $\Delta S_N$ are calculated. The multiplier 627 outputs the signals $\Delta S_1$ to $\Delta S_N$ individually to the integrator 623.

As illustrated in FIG. 6, the integrator 623 includes a summed signal generator 628 and an averager 629. The signals $\Delta S_1$ to $\Delta S_N$ output from the multiplier 627 are input to the summed signal generator 628. The summed signal generator 628 sums the reception signals, thereby performing correlation detection between the reception signal and the reference signal.

Figure 9:
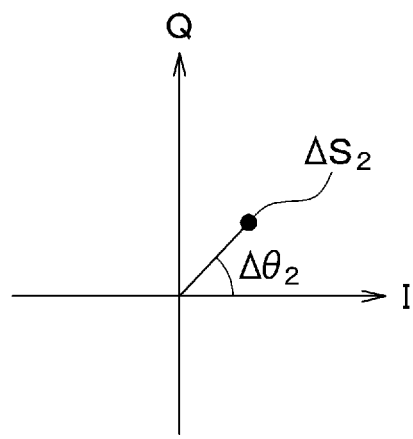
FIG. 9 is an illustration of a vector-rotated signal $\Delta S_2$.
Figure 10:
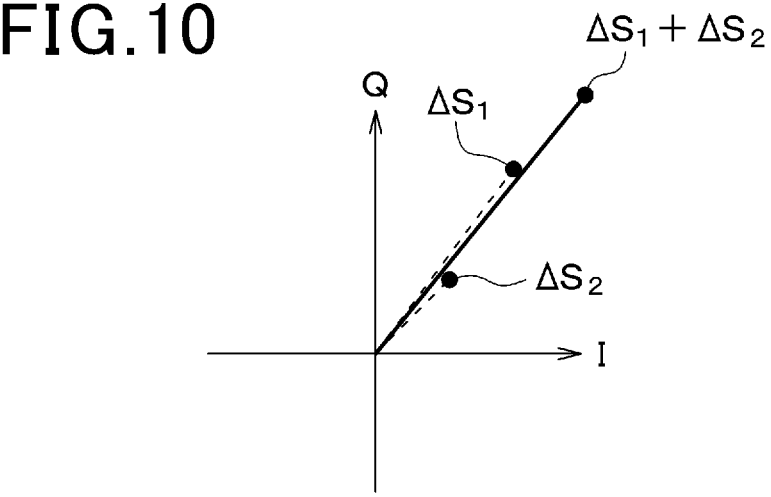
FIG. 10 is an illustration of a result of summation of vector-rotated signals $\Delta S_1$ and $\Delta S_2$.
Figure 11:
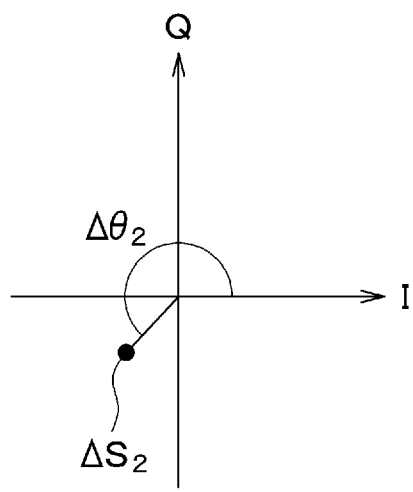
FIG. 11 is an illustration of a vector-rotated signal $\Delta S_2$.
Figure 12:
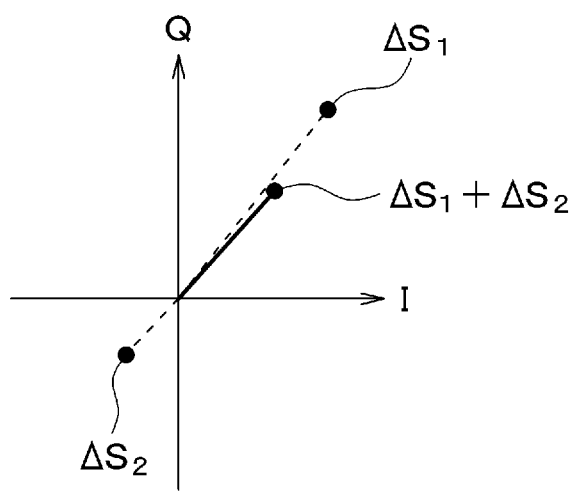
FIG. 12 is an illustration of a result of summation of vector-rotated signals $\Delta S_1$ and $\Delta S_2$.

When the signals $\Delta S_1$ to $\Delta S_N$ are summed, the amplitude increases when the correlation between the reception signal and the reference signal is high, and decreases when the correlation is low. For example, as illustrated in FIG. 8 and FIG. 9, in a case where the phases $\Delta\theta_1$ and $\Delta\theta_2$ of the signals $\Delta S_1$ and $\Delta S_2$ are equal to each other, the amplitude increases when the signal $\Delta S_2$ is added to the signal $\Delta S_1$, as illustrated in FIG. 10. On the other hand, as illustrated in FIG. 11, in a case where the phase $\Delta\theta_2$ of the signal $\Delta S_2$ is significantly different from the phase $\Delta\theta_1$ of the signal $\Delta S_1$, the amplitude decreases when the signal $\Delta S_2$ is added to the signal $\Delta S_1$, as illustrated in FIG. 12.

Summing the signals $\Delta S_1$ to $\Delta S_N$ allows the amplitude of the complex signal generated by the summed signals to represent the level of the correlation between the reception signal and the reference signal. The summed signal generator 628 outputs the complex signal generated by summation of the signals $\Delta S_1$ to $\Delta S_N$ to the averager 629.

As can be seen from FIGS. 7 through 12, the amplitude of the correlation signal depends not only on the level of correlation between the reception signal and the reference signal, but also on the amplitude of the reception signal. The larger the amplitude of the reception signal, the larger the amplitude of the correlation signal.

The averager 629 generates an averaged complex signal by dividing the amplitude of the output signal from the summed signal generator 628 by N. The complex signal averaged by the averager 629 is output to the amplitude converter 624.

The amplitude converter 624 converts the complex signal received from the averager 629 into an amplitude signal. Specifically, the amplitude converter 624 calculates the absolute value from the real and imaginary parts of this complex signal and outputs this absolute value as an amplitude. The amplitude signal generated by the amplitude converter 624 is output to the code determiner 8 as a correlation signal.

As illustrated in FIG. 5, the down-chirp filter 620B, like the up-chirp filter 620A, includes a reference signal holder 621, a vector rotator 622, an integrator 623, and an amplitude converter 624. The reference signal holder 621 through the amplitude converter 624 of the down-chirp filter 620B are configured similarly to the reference signal holder 621 through the amplitude converter 624 of the up-chirp filter 620A.

In the down-chirp filter 620B, a complex reference signal generated through quadrature detection of the reference signal corresponding to the down-chirp is input from the reference signal processor 7 to the reference signal holder 621, and correlation detection is performed between the complex reception signal and this complex reference signal. The amplitude signal generated by the amplitude converter 624 is output to the code determiner 8 as a correlation signal.

Figure 13:
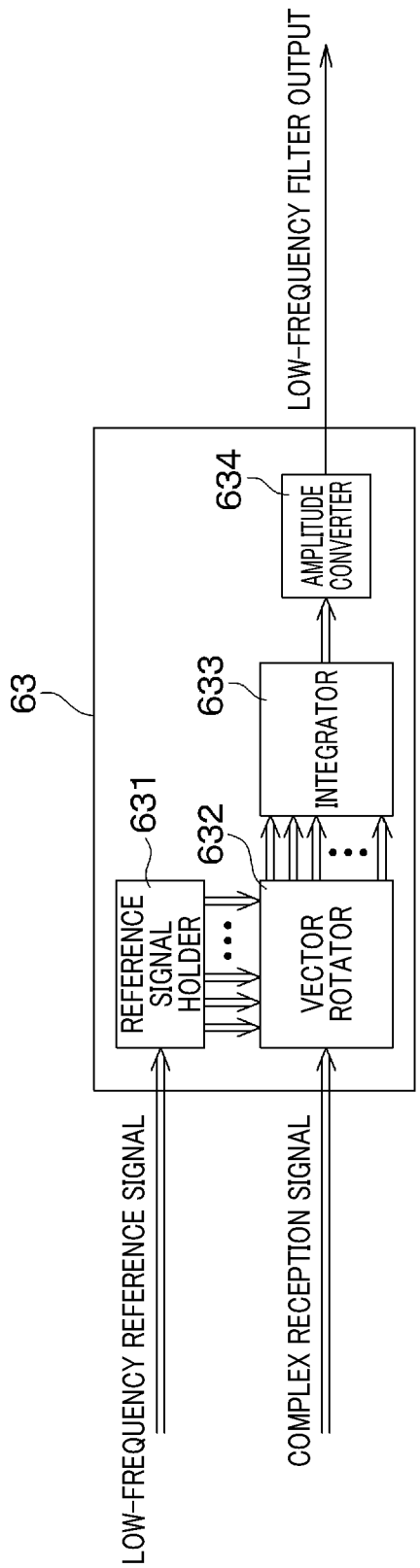
FIG. 13 is a block diagram of a correlation filter that uses low-frequency components of a reference signal.
Figure 14:
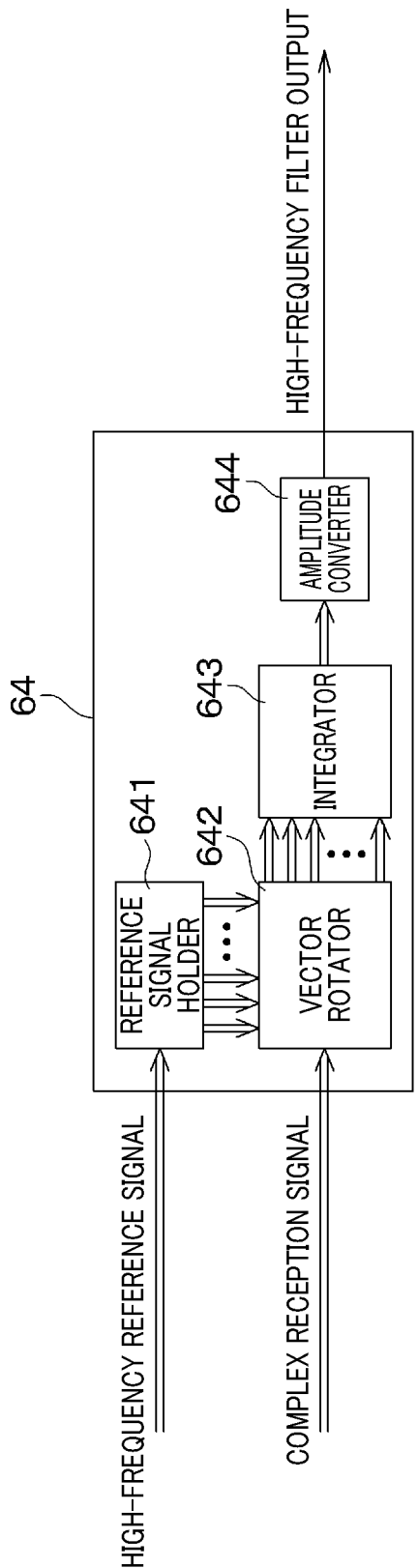
FIG. 14 is a block diagram of a correlation filter that uses high frequency components of a reference signal.

Details of correlation filters 63 and 64 will now be described. As illustrated in FIG. 13, the correlation filter 63 includes a reference signal holder 631, a vector rotator 632, an integrator 633, and an amplitude converter 634. As illustrated in FIG. 14, the correlation filter 64 includes a reference signal holder 641, a vector rotator 642, an integrator 643, and an amplitude converter 644.

The reference signal holder 631 to the amplitude converter 634 of the correlation filter 63 and the reference signal holder 641 to the amplitude converter 644 of the correlation filter 64 have the same configuration as the reference signal holder 621 to the amplitude converter 624 of the up-chirp filter 620A.

In the correlation filter 63, a complex reference signal corresponding to the second reference signal is received from the reference signal processor 7, and correlation detection is performed between the complex reception signal and this complex reference signal. In the correlation filter 64, a complex reference signal corresponding to the third reference signal is received from the reference signal processor 7, and correlation detection is performed between the complex reception signal and this complex reference signal. The amplitude signals generated by the amplitude converters 634 and 644 are output to the height determiner 9 as correlation signals.

The code determiner 8 determines whether the ultrasonic wave received by the receiver 40B is a reflected wave of the probe wave transmitted from the transmission wave 40A, based on the correlation signal output by the correlation filter 62. The code determiner 8 corresponds to a first determiner.

Specifically, the code determiner 8 determines whether the code included in the drive signal and the code included in the reception signal match. The code determiner 8 calculates a peak of the up-chirp correlation signal and a peak of the down-chirp correlation signal based on the correlation outputs of the up-chirp filter 620A and the down-chirp filter 620B. The code determiner 8 compares these peaks and determines that the code corresponding to the higher peak is included in the reception signal, and based on this determination result, determines whether the code included in the drive signal and the code included in the reception signal match. The code determiner 8 transmits the code determination result to the controller 3.

The height determiner 9 determines whether there is an object within a detection region based on the correlation signal output by the correlation filter 63 and the correlation signal output by the correlation filter 64. The height determiner 9 corresponds to a second determiner. This detection region is set based on the likelihood of contact between an object outside the vehicle and the vehicle body. For example, for an object placed on the ground, the detection region is set such that if the height of the object from the ground is greater than a predefined value, the object is in the detection region, and if the height of the object from the ground is less than or equal to the predefined value, the object is out of the detection region. For an object protruding from the ceiling of the passageway, the detection region is set such that the object is in the detection region depending on the size of the protrusion. In the present embodiment, a case where the height of an object placed on the ground, from the ground, is determined will now be described, but other criteria may be used to determine whether the object is in the detection region.

The height determiner 9 uses the directivity of ultrasonic waves to determine the height of an object. The higher the frequency of ultrasonic waves, the narrower the directivity. That is, at a position close to the central axis of the directivity of the probe wave, the amplitude of the probe wave is larger both when the frequency of the probe wave is low and when it is high. When the frequency of the probe wave is low, the amplitude of the probe wave is also larger at a greater distance from this central axis, and the amplitude of the reflected wave from objects at this position is larger. On the other hand, when the frequency of the probe wave is high, the amplitude of the probe wave is smaller at a greater distance from this central axis, and the amplitude of the reflected wave from the object at this position is smaller.

As described above, the larger the amplitude of the reception signal, the larger the amplitude of the correlation signal. Therefore, in the correlation filter 63 using the second reference signal having lower frequencies, the amplitude of the correlation output is larger both when the object is located near the central axis of the directivity of the probe wave and when the object is located away from the central axis. In the correlation filter 64 using the third reference signal having higher frequencies, the amplitude of the correlation output is larger when the object is near the central axis of the directivity of the probe wave, but the amplitude of the correlation output is smaller when the object is located away from the central axis.

Therefore, comparing the amplitude of the correlation output of the correlation filter 63 with the amplitude of the correlation output of the correlation filter 64 allows a determination to be made as to whether the object is close to the central axis of the directivity of the probe wave. For example, assuming that the amplitude of the correlation signal of correlation filter 63 is denoted by AL and the amplitude of the correlation signal of correlation filter 64 is denoted by AH, the height determiner 9 determines that the detected object is a tall object that is likely to contact the vehicle body when AH/AL is greater than the threshold value. On the other hand, when AH/AL is less than or equal to the threshold value, the height determiner 9 determines that the detected object is a low object. The height determiner 9 may compare AL and AH in a different manner. The controller 3 is connected to the ultrasonic sensor 2 via an on-board communication line to enable information communication, and is configured to control the transmit and receive operations of the ultrasonic sensor 2. The controller 3 is provided as a so-called sonar ECU and includes an on-board microcomputer formed of a CPU, a ROM, a RAM, a non-volatile rewritable memory, and other components, which are not shown in the figure. The ECU is an abbreviation for Electronic Control Unit. The non-volatile rewritable memory is, for example, an EEPROM, a Flash ROM or the like. EEPROM is an abbreviation for Electronically Erasable and Programmable Read Only Memory.

As described above, the controller 3 receives a code determination result and a height determination result from the code determiner 8 and the height determiner 9. These determination results are used for obstacle warning, automatic parking, and other processes.

The operation of the object detection device 1 will now be described. The object detection device 1 repeatedly performs the object detection process, including the process illustrated in FIG. 1n the object detection process, first, a transmission instruction is issued from the controller 3 to the drive signal generator 5, and a probe wave is transmitted from the transducer 41 based on the drive signal generated by the drive signal generator 5. Upon detection of reception of the ultrasonic signal by the transceiver 4, the object detection device 1 performs the process illustrated in FIG. 15 to detect an object.

First, at step S101, the quadrature detector 61 quadrature detects the reception signal output from the transceiver 4 to generate a complex reception signal and outputs it to the correlation filters 62, 63, 64. The quadrature detector 71 quadrature detects the reference signals corresponding to respective ones of the up-chirp and the down-chirp output from the driving signal generator 5, generates complex reference signals, and outputs the complex reference signals to the correlation filters 62, 63, 64. The complex reference signals corresponding to the first, second, and third reference signals are input to the correlation filters 62, 63, and 64, respectively.

Subsequently, at step S102, the correlation filter 62 performs correlation detection between the complex reception signal output from the quadrature detector 61 and the complex reference signal corresponding to the up-chirp, and outputs a correlation signal to the code determiner 8. The correlation filter 62 performs correlation detection between the complex reception signal and the complex reference signal corresponding to the down-chirp, and outputs a correlation signal to the code determiner 8.

The correlation filter 63 performs correlation detection between the complex reception signal and the complex reference signal corresponding to the second reference signal and outputs the correlation signal to the height determiner 9. The correlation filter 64 performs correlation detection between the complex reception signal and the complex reference signal corresponding to the third reference signal, and outputs the correlation signal to the height determiner 9.

Subsequently, at step S103, the code determiner 8 detects peaks from the correlation signals. Specifically, the code determiner 8 detects peaks from the up-chirp correlation signal and the down-chirp correlation signal output from the correlation filter 62. For example, the code determiner 8 compares the amplitude of the correlation signal with a threshold value, and if there is a time interval where the amplitude of the correlation signal is greater than the threshold value, the maximum value over this time interval is the peak. Alternatively, the amplitude value at the center of this time interval may be taken as the peak.

Subsequently, at step S104, the code determiner 8 determines whether the codes match between the driving signal and the reception signal. Specifically, the code determiner 8 compares the peak of the up-chirp correlation signal and the peak of the down-chirp correlation signal. If the drive signal contains an up-chirp and the peak of the up-chirp correlation signal is higher than the peak of the down-chirp correlation signal, the code determiner 8 determines that the codes match. If the drive signal contains a down-chirp and the peak of the down-chirp correlation signal is higher than the peak of the up-chirp correlation signal, the code determiner 8 determines that the codes match. In this manner, when the codes match, an object is thereby detected.

If the drive signal contains an up-chirp and the peak of the up-chirp correlation signal is lower than or equal to the peak of the down-chirp correlation signal, the code determiner 8 determines that the codes do not match. If the drive signal contains a down-chirp and the peak of the down-chirp correlation signal is lower than or equal to the peak of the up-chirp correlation signal, the code determiner 8 determines that the codes do not match.

If the codes are determined to match at step S104, the process proceeds to step S105. If the codes are determined not to match, the process ends.

At step S105, the height determiner 9 determines the height of the object based on the correlation outputs of the correlation filters 63 and 64. Specifically, the height determiner 9 compares the amplitude ratio AH/AL with the predefined threshold value, and if AH/AL is greater than the threshold value, determines that the detected object is a tall object that is likely to contact the vehicle body. On the other hand, if the amplitude ratio AH/AL is less than or equal to the threshold value, the height determiner 9 determines that the detected object is a low object. After completion of step S105, the process ends.

The range of the correlation signals used by the height determiner 9 for determination at step S105 is set based on the correlation signals output by the correlation filter 62. Specifically, the range of the amplitudes AL and AH used by the height determiner 9 for determination is set based on the time when the output of the correlation filter 62 peaks.

For example, in the case of transmission of a probe wave containing an up-chirp, the second reference signal used by the correlation filter 63 is the first half of the first reference signal used by the up-chirp filter 620A, and the third reference signal used by the correlation filter 64 is the second half of the first reference signal. Therefore, upon reception of the reflected wave, the output of the correlation filter 63 peaks at a time before the output of the up-chirp filter 620A peaks, and the output of the correlation filter 64 peaks at a time after the output of the up-chirp filter 620A peaks.

The height determiner 9 uses, as the amplitude AL, the amplitude of the output of the correlation filter 63 for a time interval from a predefined amount of time before the time at which the output of the up-chirp filter 620A peaks to the time at which the output of the up-chirp filter 620A peaks. The height determiner 9 uses, as the amplitude AH, the amplitude of the output of the correlation filter 64 for a time interval from the time at which the output of the up-chirp filter 620A peaks to a predefined amount of time after the time at which the output of the up-chirp filter 620A peaks.

In the case of transmission of a probe wave containing a down-chirp, the height determiner 9 uses, as the amplitude AL, the amplitude of the output of the correlation filter 63 for a time interval from a predefined amount of time before the time at which the output of the down-chirp filter 620B peaks to the time at which the output of the down-chirp filter 620B peaks. The height determiner 9 uses, as the amplitude AH, the amplitude of the output of the correlation filter 64 for a time interval from the time at which the output of the down-chirp filter 620B peaks to a predefined amount of time after the time at which the output of the down-chirp filter 620B peaks.

Figure 15:
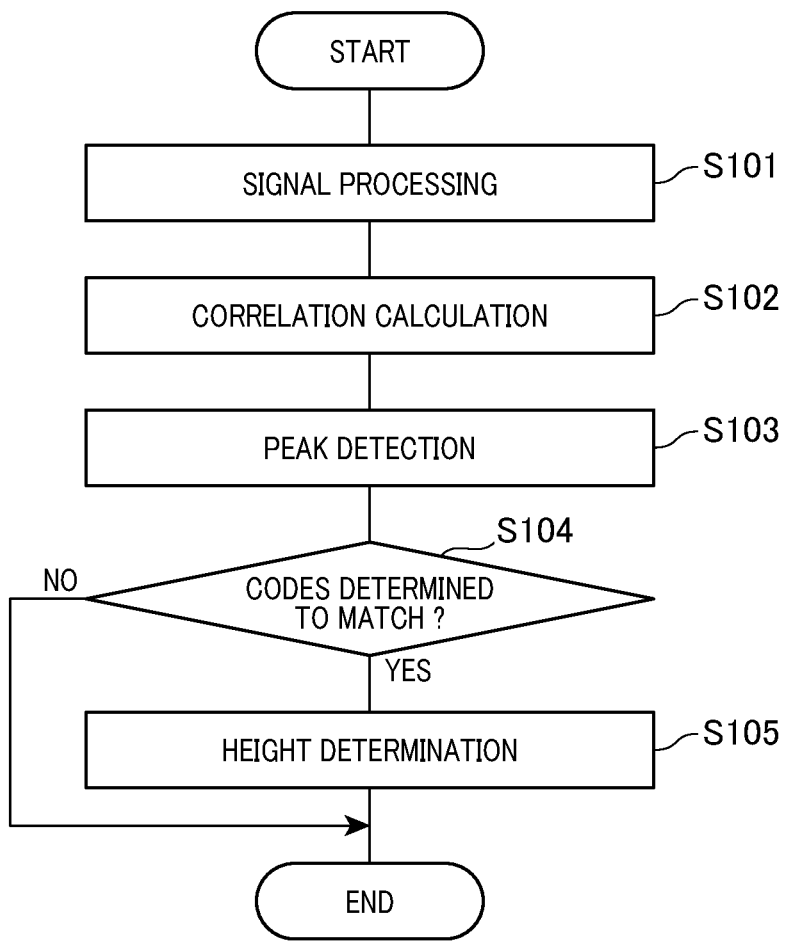
FIG. 15 is a flowchart of an object detection process.

Upon completion of the process illustrated in FIG. 15, a result of object detection by the ultrasonic sensor 2 is transmitted to the controller 3. This detection result includes the code determination result by the code determiner 8 and the height determination result by the height determiner 9. This detection result includes, for example, a distance between the own vehicle and the object measured using the TOF method. TOF is an abbreviation for Time of Flight. Calculation of this distance is performed, for example, by the code determiner 8, but may alternatively be performed by a calculator that is not shown.

Figure 16:
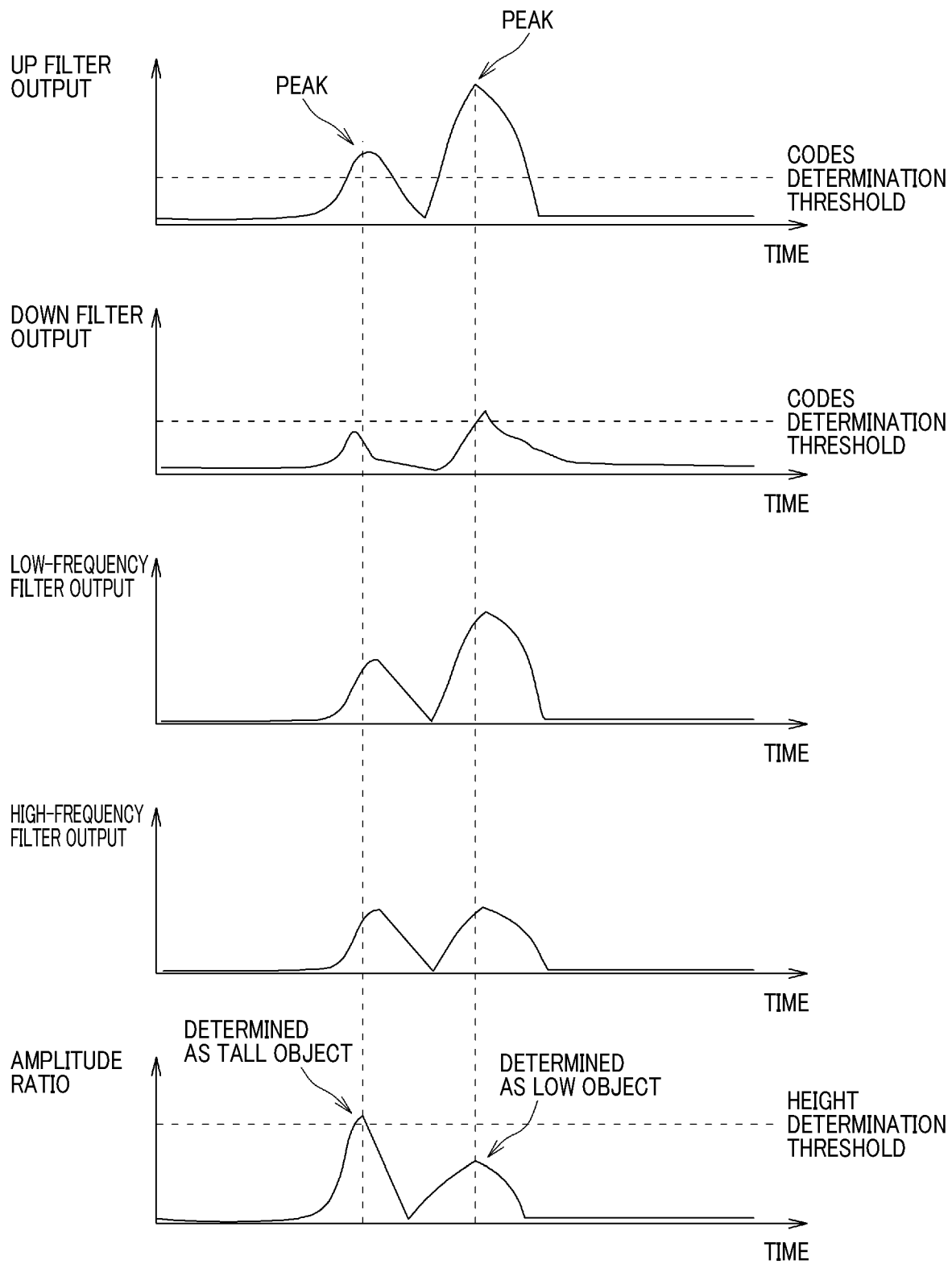
FIG. 16 is an example of correlation outputs.

Assume that, as a result of transmitting the probe wave containing the up-chirp, two reflected waves are received at different times and the correlation output is obtained as illustrated in FIG. 16. Regarding the up-chirp filter 620A, the amplitude of the correlation output is greater than the threshold value in each of the time intervals corresponding to the two reflected waves. The maximum value in each time interval is considered to be the peak of the output of the up-chirp filter 620A.

Regarding the down chirp filter 620B, no peaks are detected in the time interval corresponding to the first reflected wave, because the amplitude of the correlation output is less than the threshold value. In the time interval corresponding to the second reflected wave, the amplitude of the correlation output is greater than the threshold value, but the peak in this time interval is less than the peak of the output of the up-chirp filter 620A. Therefore, in this case, for each of the two reflected waves, the codes are determined to match at step S104, and an object is detected.

In FIG. 16, in the time interval corresponding to the first peak, the amplitude AL of the output of correlation filter 63 and the amplitude AH of the output of correlation filter 64 are almost equal. The amplitude ratio AH/AL calculated using these amplitudes AL and AH is greater than the threshold value. Therefore, at step S105, the object detected by the first reflected wave is determined to be a tall object that is likely to come into contact with the vehicle body.

On the other hand, in the time interval corresponding to the second peak, the amplitude AL of the output of the correlation filter 63 is greater than the amplitude AH of the output of the correlation filter 64. The amplitude ratio AH/AL calculated using these amplitudes AL and AH is less than the threshold value. Therefore, at step S105, the object detected by the second reflected wave is determined to be a low object.

As described above, in the case of transmitting a probe wave containing an up-chirp, the output of the correlation filter 63 peaks at a point in time earlier than the peak of the output of the up-chirp filter 620A. The output of the correlation filter 64 peaks at a point in time later than the peak of the output of the up-chirp filter 620A. In FIG. 16, for the purpose to make the difference in amplitude easier to understand, the output of the correlation filter 63 is shown at a time later than it actually is, and the output of the correlation filter 64 is shown at a time earlier than it actually is.

Figure 17:
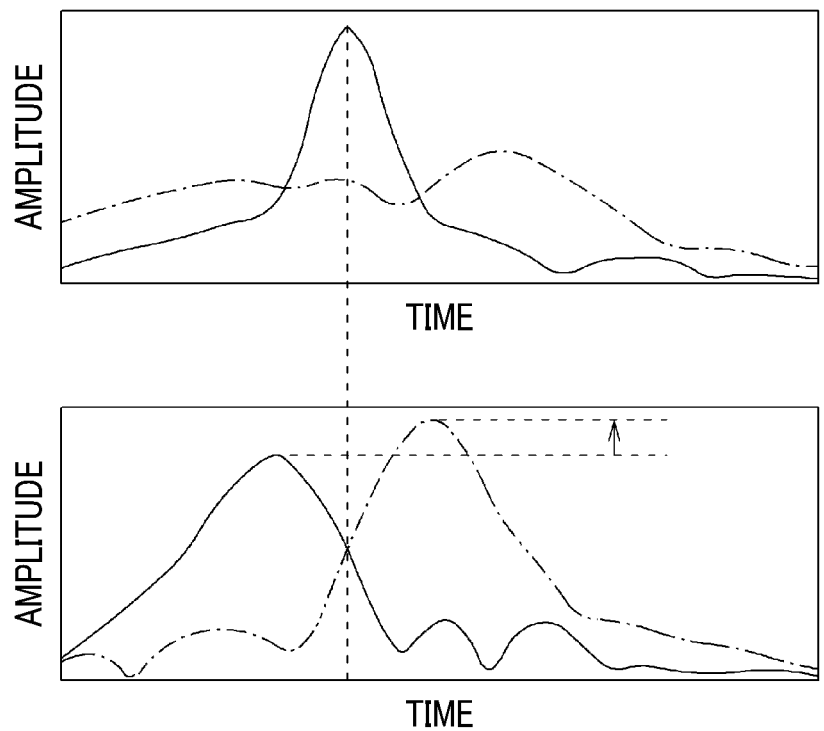
FIG. 17 is an illustration of correlation outputs when probe waves were transmitted toward a tall wall.
Figure 18:
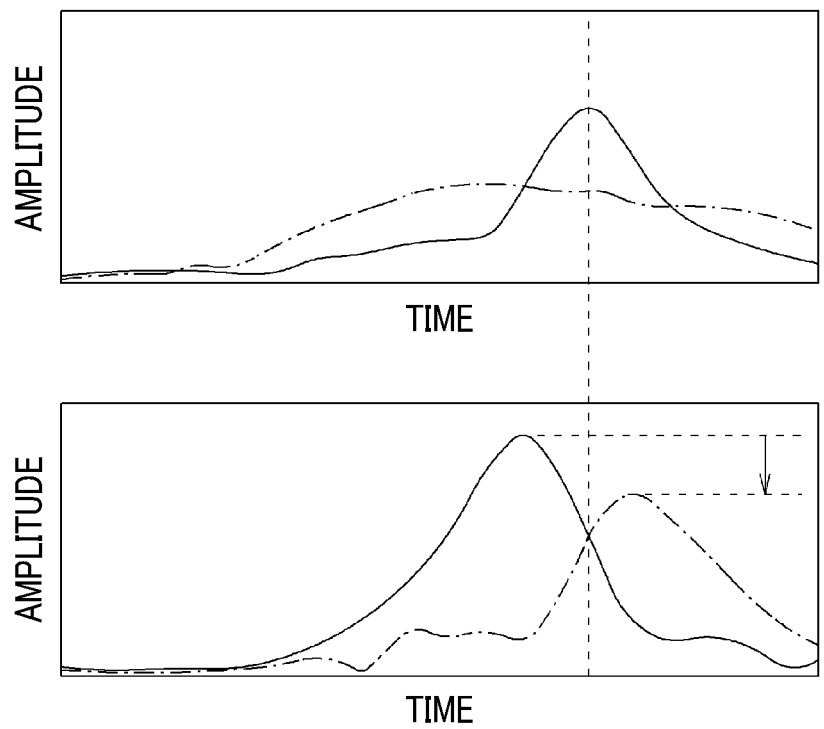
FIG. 18 is an illustration of correlation outputs when probe waves were transmitted toward a wheel chock having a height of 10 cm.
Figure 19:
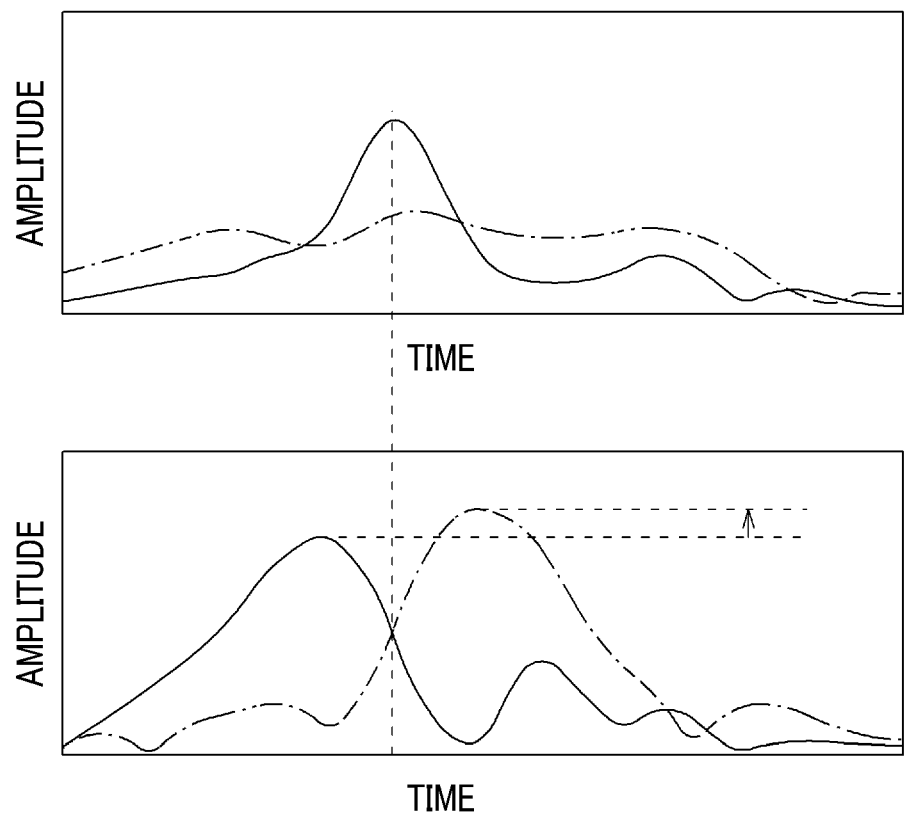
FIG. 19 is an illustration of correlation outputs when probe waves were transmitted toward a tall pole.

FIGS. 17 through 19 illustrate results of the experiment conducted by the inventors. In this experiment, various objects were disposed in front of the ultrasonic sensor 2 and probe waves each containing an up-chirp was transmitted wave to detect the objects. The upper figures in FIGS. 17 through 19 illustrate the outputs of the up-chirp filter 620A and the down-chirp filter 620B. The solid line indicates the output of the up-chirp filter 620A, and the dashed-dotted line indicates the output of the down-chirp filter 620B. The lower figures in FIGS. 17 through 19 illustrate the outputs of the correlation filter 63 and the correlation filter 64. The solid line indicates the output of the correlation filter 63, and the dashed-dotted line indicates the output of the correlation filter 64.

FIG. 17 illustrates outputs of the correlation filters 62, 63, and 64 when a tall wall is disposed in front of the ultrasonic sensor 2. As illustrated in FIG. 17, the peak of the output of the up-chirp filter 620A is greater than the peak of the output of the down-chirp filter 620B. Therefore, the codes were correctly determined to match at step S104. In addition, the amplitude of the output of correlation filter 63 is less than the amplitude of the output of correlation filter 64. Therefore, the amplitude ratio AH/AL is greater than the predefined threshold, and the object was correctly determined to be a tall object at step S105.

FIG. 18 illustrates outputs of the correlation filters 62, 63, and 64 when a wheel chock having a height of 10 cm is disposed in front of the ultrasonic sensor 2. Even for such a low object as the wheel chock, the peak of the output of the up-chirp filter 620A was greater than the peak of the output of the down-chirp filter 620B, and the code was correctly determined in the same way. In addition, the amplitude of the output of the correlation filter 63 is greater than the amplitude of the output of the correlation filter 64. Therefore, the amplitude ratio AH/AL is less than or equal to the predefined threshold, and the object was correctly determined to be a low object at step S105.

FIG. 19 illustrates outputs of the correlation filters 62, 63, and 64 when a tall pole is disposed in front of the ultrasonic sensor 2. Even for such a small width object as the pole, the peak of the output of the up-chirp filter 620A was greater than the peak of the output of the down-chirp filter 620B, and the code was correctly determined in the same way. The amplitude of the output of correlation filter 63 is less than the amplitude of the output of correlation filter 64. Therefore, the amplitude ratio AH/AL was greater than the pre-defined threshold, and the object was correctly determined to be a tall object at step S105. In this manner, the code and height could be correctly determined for a variety of objects.

As described above, in the present embodiment, the code determination is made by correlation detection using the first reference signal corresponding to the drive signal. The second reference signal having lower frequencies and the third reference signal having higher frequencies are extracted from the first reference signal, and the height determination is performed by correlation detection using these second and third reference signals. Therefore, there is no need to transmit two signals, one for code determination and the other for height determination, and both the code and height can be determined with a single transmission.

According to the above embodiment, the following advantage can be provided.

(1) The time interval of the correlation signal used by the height determiner 9 for determination is set based on the correlation signal output by the correlation filter 62. Since the detection accuracy of the center of the reflected wave is improved owing to the pulse compression effect of the correlation output of the correlation filter 62, setting the time interval of the correlation signal in this way improves the accuracy of the height determination.

(2) The time interval of the correlation signal used by the height determiner 9 for determination is set based on the time when the output of the correlation signal of the correlation filter 62 peaks. Since the detection accuracy of the center of the reflected wave is improved owing to the pulse compression effect of the correlation output of the correlation filter 62, setting the time interval of the correlation signal in this way improves the accuracy of the height determination.

Second Embodiment

A second embodiment will be now described. The present embodiment is different from the first embodiment only in that the configurations of the correlation filters 62, 63, and 64 are changed. The other elements are similar as in the first embodiment. Thus, only differences from the first embodiment will be described.

Figure 20:
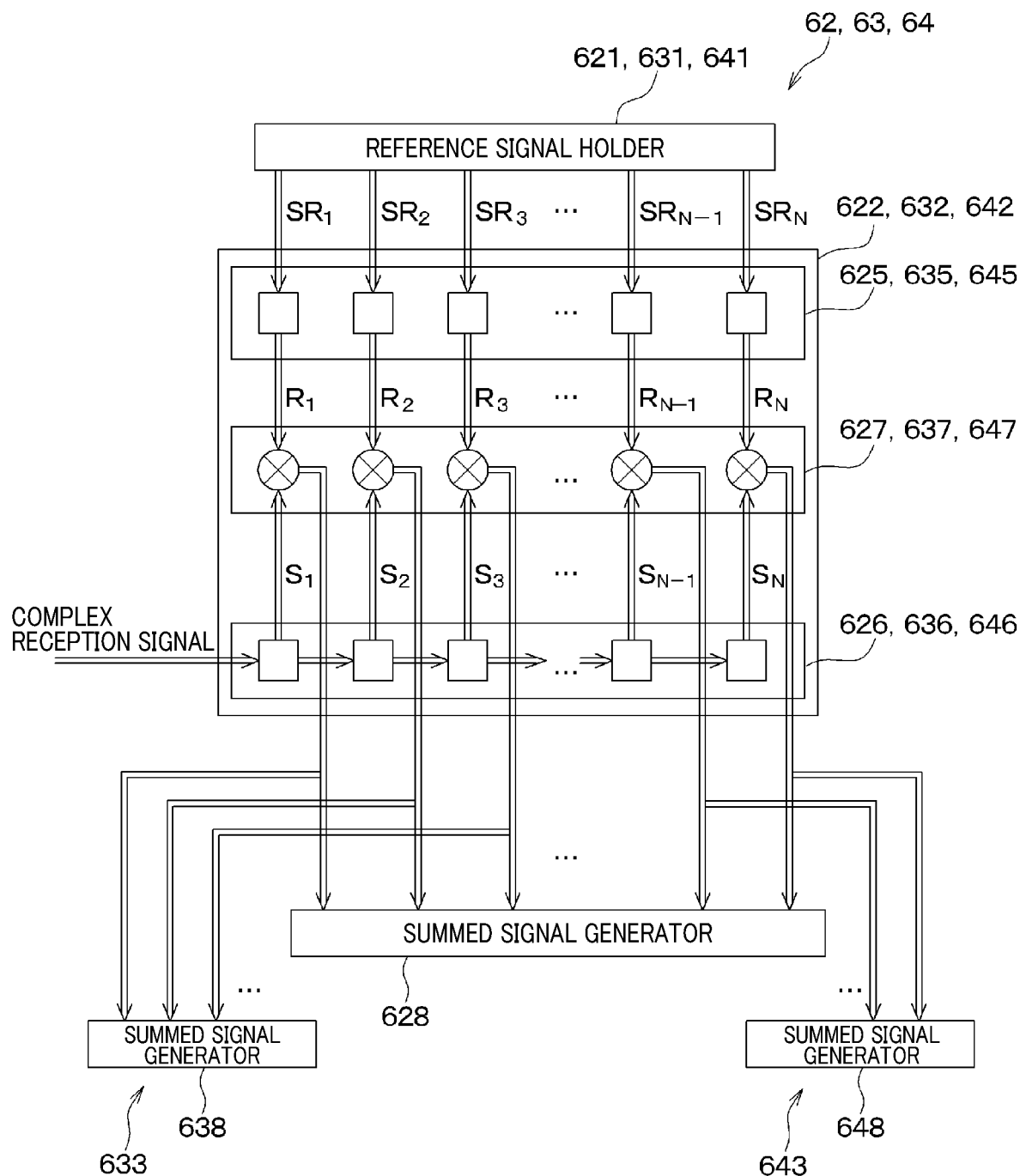
FIG. 20 is a block diagram of vector rotators in three correlation filters according to a second embodiment.

In the present embodiment, the correlation filters 62, 63, and 64 share a portion of the calculation circuitry. Specifically, as illustrated in FIG. 20, the vector rotator 632 of the correlation filter 63 includes a matrix transformer 635, a reception signal holder 636, and a multiplier 637, and the integrator 633 includes a summed signal generator 638 and an averager that is not shown. The vector rotator 642 of the correlation filter 64 includes a matrix transformer 645, a reception signal holder 646, and a multiplier 647, and the integrator 643 includes a summed signal generator 648 and an averager that is not shown. The multiplier 637 calculates a correlation between the reception signal and the second reference signal, and corresponds to a second correlation calculator. The multiplier 647 calculates a correlation between the reception signal and the third reference signal, and corresponds to a third correlation calculator.

The reference signal holders 631 and 641 are configured as a portion of the reference signal holder 621. The reference signal holder 631 is configured as a portion of the reference signal holder 621 where the complex reference signal corresponding to the second reference signal is received, held, and output. The reference signal holder 641 is configured as a portion of the reference signal holder 621 where the complex reference signal corresponding to the third reference signal is received, held, and output.

For example, assume that N is an even number and that the first half of the first reference signal is used as the second reference signal and the second half of the first reference signal is used as the third reference signal. In this case, the reference signal holder 631 is configured as a portion of the reference signal holder 621 where the signals $SR_1$ to $SR_{N/2}$ are held and output, and the reference signal holder 641 is configured as a portion of the reference signal holder 621 where the signals $SR_{N/2+1}$ to $SR_N$ are held and output.

Similarly, the matrix transformer 635, the reception signal holder 636, and the multiplier 637 are configured as portions of the matrix transformer 625, the reception signal holder 626, and the multiplier 627, respectively. That is, the matrix transformer 635 is configured as a portion of the matrix transformer 625 where the complex reception signal corresponding to the second reference signal is transformed into a rotation matrix. The reception signal holder 636 is configured as a portion of the reception signal holder 626 where the portion of the complex reception signal used for correlation detection with the second reference signal is received, held, and output. The multiplier 637 is configured as a portion of the multiplier 627 that multiplies the complex reception signal output from the reception signal holder 636 by the rotation matrix generated by the matrix transformer 635.

For example, in the above case, the matrix transformer 635 is configured as a portion of the matrix transformer 625 where the signals $SR_1$ to $SR_{N/2}$ are received, transformed into the rotation matrices $R_1$ to $R_{N/2}$, and output. The reception signal holder 636 is configured as a portion of the reception signal holder 626 where the signals $S_1$ to $S_{N/2}$ are received, held, and output. The multiplier 637 is configured as a portion of the multiplier 627 that multiplies the signals $S_1$ to $S_{N/2}$ output from the reception signal holder 636 by the rotation matrices $R_1$ to $R_{N/2}$ generated by the matrix transformer 635.

The matrix transformer 645, the reception signal holder 646, and the multiplier 647 are configured as portions of the matrix transformer 625, the reception signal holder 626, and the multiplier 627, respectively. That is, the matrix transformer 645 is configured as a portion of the matrix transformer 625 where the complex reception signal corresponding to the third reference signal is transformed into a rotation matrix. The reception signal holder 646 is configured as a portion of the reception signal holder 626 where the portion of the reception signal used for correlation detection with the third reference signal is received, held, and output. The multiplier 647 is configured as a portion of the multiplier 627 that multiplies the complex reception signal output from the reception signal holder 646 and the rotation matrix generated by the matrix transformer 645.

For example, in the above case, the matrix transformer 645 is configured as a portion of the matrix transformer 625 where the signals $SR_{N/2+1}$ to $SR_N$ are received, transformed to the rotation matrices $R_{N/2+1}$ to $R_N$, and output. The reception signal holder 646 is configured as a portion of the reception signal holder 626 where the signals $S_{N/2+1}$ to $S_N$ are received, held, and output. The multiplier 647 is configured as a portion of the multiplier 627 that multiplies the signal $S_{N/2+1}$ to $S_N$ output from the reception signal holder 646 and the rotation matrices $R_{N/2+1}$ to $R_N$ generated by the matrix transformer 645.

In this manner, the multipliers 627, 637, and 647 share the same calculation circuitry that performs correlation calculations, specifically, the calculation circuitry that performs the multiplication between the complex reception signal and each of the first, second, and third reference signals.

The multiplier 627 outputs the signals $\Delta S_1$ to $\Delta S_N$ generated by multiplication individually, as in the first embodiment. For example, in the above case, the signals $\Delta S_1$ to $\Delta S_{N/2}$ are input to the summed signal generator 628 and the summed signal generator 638, and the signals $\Delta S_{N/2+1}$ to $\Delta S_N$ are input to the summed signal generator 628 and the summed signal generator 648.

The summed signal generator 638 sums the input signals and outputs the resulting complex signal to an averager that is not shown. This averager averages the amplitude of the output signal from the summed signal generator 638 by dividing it by the number of added signals. For example, in the above case, the averager divides this amplitude by N/2. The averaged complex signal is output to the amplitude converter 634. The amplitude converter 634 converts the input signal to an amplitude and outputs it as a correlation signal, as in the first embodiment.

Similarly, the summed signal generator 648 sums the input signals and outputs the resulting complex signal to an averager that is not shown. This averager averages the amplitude of the output signal from the summed signal generator 648 by dividing it by the number of added signals. For example, in the above case, the averager divides this amplitude by N/2. The averaged complex signal is output to the amplitude converter 644. The amplitude converter 644 converts the input signal to an amplitude and outputs it as a correlation signal, as in the first embodiment.

The correlation filters 63 and 64 share the calculation circuitry with both the up-chirp filter 620A and the down-chirp filter 620B. Between the multiplier 627 of the up-chirp filter 620A and the multiplier 627 of the down-chirp filter 620B and the summed signal generators 638 and 648, there is provided circuitry that selects the signals to be input to the summed signal generators 638 and 648.

This circuitry enables selection of the signals to be input to the summed signal generators 638 and 648 according to the drive signal. That is, when transmitting a probe wave including an up-chirp, the first half of the signals $\Delta S_1$ to $\Delta S_N$ output from the multiplier 627 of the up-chirp filter 620A are input to the summed signal generator 638, and the second half of them are input to the summed signal generator 648. On the other hand, when transmitting a probe wave including a down-chirp, the first half of the signals $\Delta S_1$ to $\Delta S_N$ output from the multiplier 627 of the down-chirp filter 620B are input to the summed signal generator 648, and the second half of them is input to the summed signal generator 638.

The present embodiment can provide the same advantages as the first embodiment from the same configuration and operations as in the first embodiment.

According to the above embodiment, the following advantage can be provided.

(1) The multipliers 627, 637, and 647 share the same calculation circuitry that perform the multiplication, and the three types of correlation filters are processed in parallel by changing the time interval in which the signals are summed. This can reduce the circuitry that performs the calculation of correlation detection, particularly the multiplier which has a large circuitry scale, which can reduce the amount of calculation and the circuitry scale.

Third Embodiment

A third embodiment will be now described. The present embodiment is different from the first embodiment only in that the frequencies of the reference signals are changed. The other elements are similar as in the first embodiment. Thus, only differences from the first embodiment will be described.

In the present embodiment, the speed of the own vehicle measured by a speed sensor (not shown) is input to the ultrasonic sensor 2, and the frequency of the reference signal is corrected according to this speed. Specifically, as illustrated in FIG. 21, the reference signal is a drive signal shifted to a higher frequency side.

Figure 21:
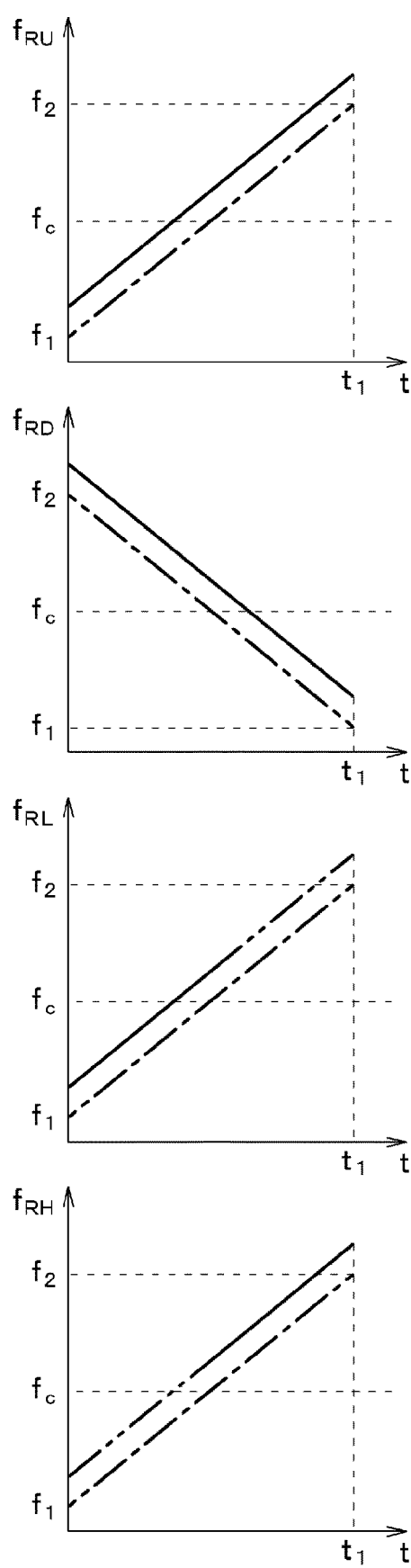
FIG. 21 is an illustration of frequencies of reference signals according to a third embodiment.

The solid line in FIG. 21 indicates the corrected reference signal, and the dashed-dotted line indicates the original reference signal having the same frequencies as the drive signal. In the graphs of $f_{RL}$ and $f_{RH}$, the two dotted lines indicate the portions of the corrected first reference signal that are excluded from the second and third reference signals. The amount of frequency shift is set according to the vehicle speed such that the higher the vehicle speed, the larger the amount of shift.

The present embodiment can provide the same advantages as the first embodiment from the same configuration and operations as in the first embodiment.

According to the above embodiment, the following advantage can be provided.

(1) The frequency of the reference signal is corrected according to the vehicle speed. Therefore, deterioration of the accuracy of code determination and the accuracy of height determination due to the Doppler shift can be suppressed.

Fourth Embodiment

A fourth embodiment will be now described. The present embodiment is different from the first embodiment only in that a configuration to normalize and phase rotate the complex signal is added. The other elements are similar as in the first embodiment. Thus, only differences from the first embodiment will be described.

Figure 22:
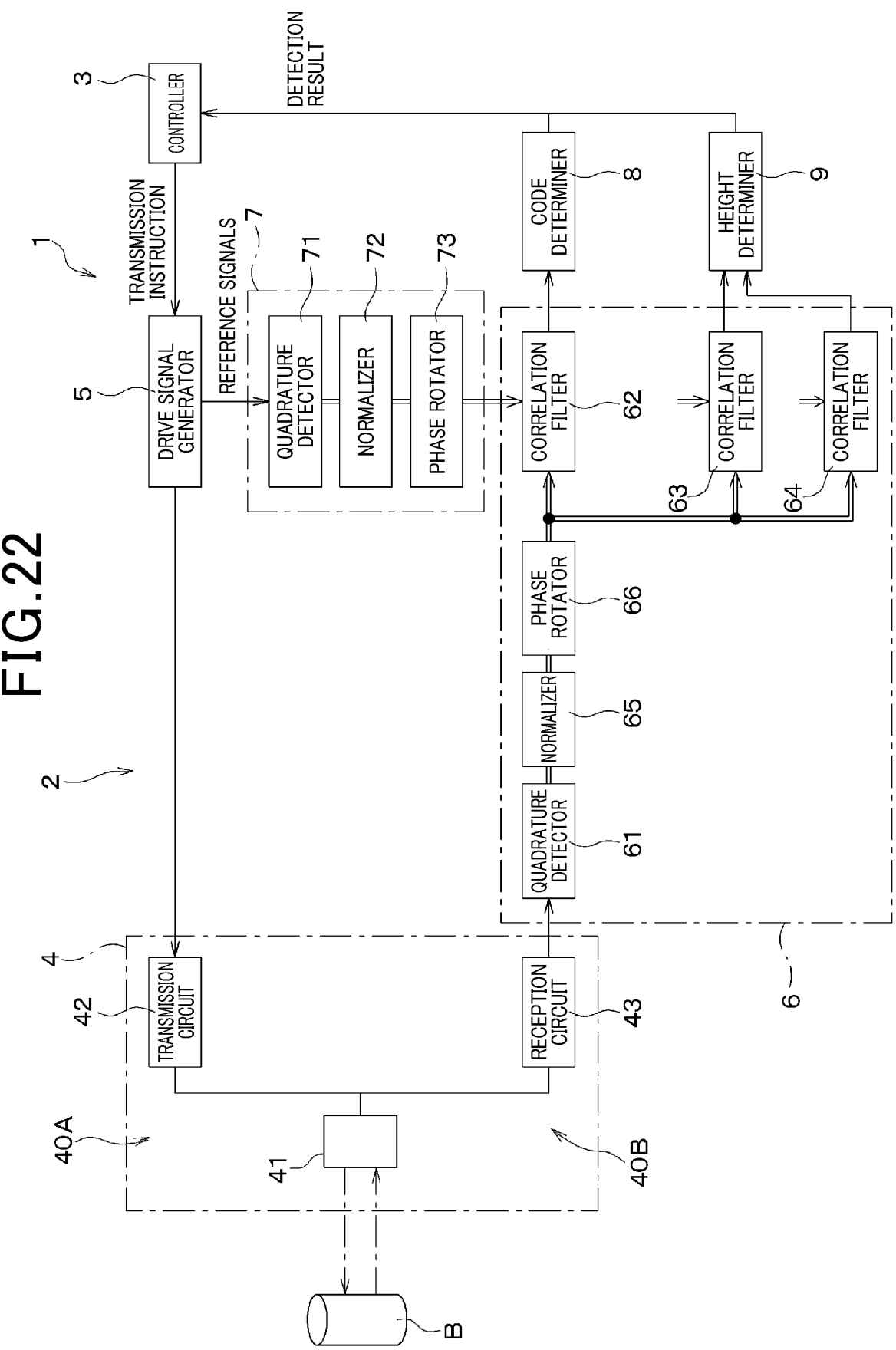
FIG. 22 is a block diagram of an object detection device according to a fourth embodiment.

As illustrated in FIG. 22, the reception signal processor 6 of the present embodiment includes a normalizer 65 and a phase rotator 66, in addition to the quadrature detector 61, the correlation filter 62, the correlation filter 63, and the correlation filter 64. The reference signal processor 7 includes a normalizer 72 and a phase rotator 73, in addition to the quadrature detector 71. The drive signal generator 5, the reception signal processor 6, the reference signal processor 7, and the code determiner 8, and the height determiner 8 are configured, for example, as a DSP having the functions programmed, such as the above-described drive signal generation, quadrature detection, correlation calculation, code determination, height determination, as well as normalization, phase rotation and the like as described later.

The normalizer 65 normalizes the complex reception signal output from the quadrature detector 61 such that the amplitude of the complex reception signal is constant. As illustrated in FIG. 22, the complex reception signal output from the quadrature detector 61 is input to the normalizer 65.

The normalizer 65 converts the complex reception signal output from the quadrature detector 61 into an amplitude. That is, the normalizer 65 calculates the amplitudes $r_1$ to $r_N$ from the real parts $I_1$ to $I_N$ and the imaginary parts $Q_1$ to $Q_N$ for the signals $S_1$ to $S_N$. The amplitude $r_1$ is calculated as $r_1=\sqrt{(I_1^2+Q_1^2)}$, and the amplitudes $r_2$ to $r_N$ are calculated in the same manner.

The normalizer 65 converts, based on the amplitudes $r_1$ to $r_N$, the complex reception signal received from the quadrature detector 61 into a unit vector by normalizing the amplitude while leaving the phase unchanged. Specifically, the normalizer 65 divides the complex reception signal by its original amplitude. That is, the real parts $I_1$ to $I_N$ of the signals $S_1$ to $S_N$ are converted to $I_1/r_1$ to $I_N/r_N$, and the imaginary parts $Q_1$ to $Q_N$ of the signals $S_1$ to $S_N$ are converted to $Q_1/r_1$ to $Q_N/r_N$.

The phase rotator 66 rotates the phase of the complex reception signal. The phase rotator 66 corresponds to a first phase rotator. The phase rotator 66 receives the complex reception signal normalized by the normalizer 65. The complex reception signal whose phase is rotated by the phase rotator 66 is output to the correlation filters 62, 63, 64.

Specifically, the phase rotator 66 processes the received signal as follows. That is, using $I'=\cos\theta$, $Q'=\sin\theta$, $\cos 2\theta=1-2\sin^2\theta$, and $\sin 2\theta=2\sin\theta\cos\theta$, $\cos 2\theta$ and $\sin 2\theta$ are calculated from $I'$ and $Q'$, where $I'$ is the real part of the normalized complex reception signal, $Q'$ is the imaginary part of the normalized complex reception signal, and $\theta$ is the phase. The real and imaginary parts of the new complex reception signal are output as $\cos 2\theta$ and $\sin 2\theta$, respectively.

In the present embodiment, the normalized and phase-rotated signals $S_1$ to $S_N$ are input to the correlation filters 62, 63, 64, and correlation detection with the complex reference signal is performed. In the multiplier 627 of the vector rotator 622, Lin to $I_N/r_N$ and $Q_1/r_1$ to $Q_N/r_N$ are used instead of $I_1$ to $I_N$ and $Q_1$ to $Q_N$ to perform the calculations according to the relational expression 2.

The amount of phase rotation is equal to an integral multiple, e.g., twice as above. Alternatively, the phase may be rotated by other multiples. For example, in the phase rotator 66, a twice the phase rotation may be performed twice and a signal with four times the phase rotated may be output, such as $\cos 4\theta=1-2\sin^2 2\theta$ and $\sin 4\theta=2\sin 2\theta\cos 2\theta$.

The normalizer 72 normalizes each of the complex reference signals output from the quadrature detector 71 such that the amplitude is constant. The normalizer 72 normalizes the complex reference signal in a similar manner as in the normalizer 65. The complex reference signal normalized by the normalizer 72 is output to the phase rotator 73.

The phase rotator 73 rotates the phase of the complex reference signal. The phase rotator 73 corresponds to a second phase rotator. The phase rotator 73 receives the complex reference signal normalized by the normalizer 72, and the complex reference signal whose phase is rotated by the phase rotator 73 is output to the correlation filters 62, 63, 64. In the phase rotator 73, phase rotation is performed in the same manner as in the phase rotator 66. As the phase of the complex reference signal corresponding to the first reference signal is rotated by the phase rotator 73, the phases of the complex reference signals corresponding to the second and third reference signals are also rotated.

The correlation filter 62 performs correlation detection between the phase-rotated complex reception signal and the phase-rotated complex reference signal and outputs a correlation signal. Specifically, the up-chirp filter 620A of the correlation filter 62 receives the normalized and phase-rotated signals $SR_1$-$SR_N$ corresponding to the up-chirp from the phase rotator 73. The down-chirp filter 620B of the correlation filter 62 receives the normalized and phase-rotated signals $SR_1$-$SR_N$ corresponding to the down-chirp from the phase rotator 73. In each of the up-chirp filter 620A and the down-chirp filter 620B, correlation detection is performed between the normalized and phase-rotated complex reception signal and the normalized and phase-rotated complex reference signal, and the correlation signal is output.

The signal corresponding to the second reference signal, among the normalized and phase-rotated signals $SR_1$ to $SR_N$, is input to the correlation filter 63. Correlation detection is performed between this signal and the normalized and phase rotated complex reception signal, and the correlation signal is output. The signal corresponding to the third reference signal, among the normalized and phase-rotated signals $SR_1$ to $SR_N$, is input to the correlation filter 64. Correlation detection is performed between this signal and the normalized and phase rotated complex reception signal, and the correlation signal is output.

In the object detection process of the present embodiment, at step S101 in FIG. 15, the quadrature detector 61 converts the reception signal into a complex signal, the normalizer 65 normalizes the complex reception signal, and then the phase rotator 66 performs phase rotation by rotating the phase of the normalized complex reception signal. After the quadrature detector 71 converts the reference signal into a complex signal and the normalizer 72 normalizes the complex reference signal, and then the phase rotator 73 performs phase rotation by rotating the phase of the normalized complex reference signal. At step S102, the correlation filters 62, 63, 64 perform correlation detection between the phase-rotated complex reception signal and the phase-rotated complex reference signal. At step S104, the code determiner 8 makes a code determination based on this correlation detection result. At step S105, the height determiner 9 makes a height determination based on this correlation detection result.

Figure 23:
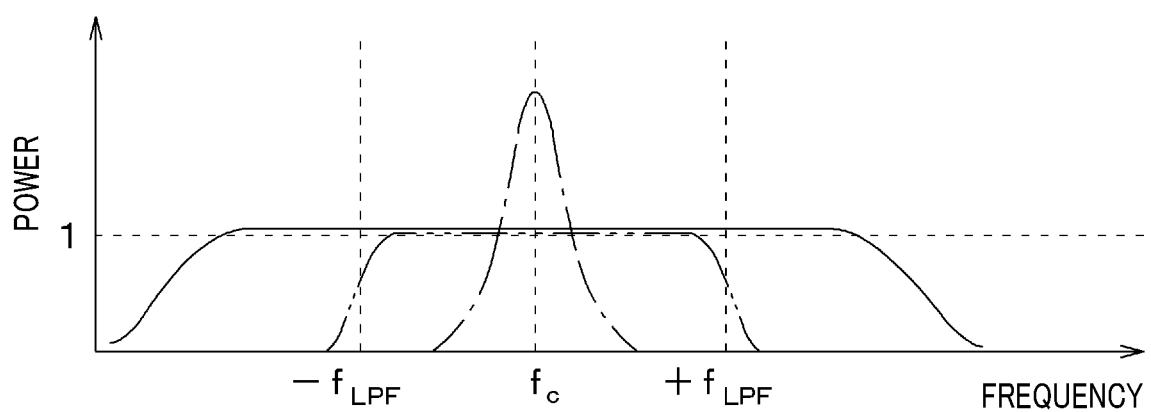
FIG. 23 is an illustration of broadening of a frequency band arising from normalization and phase rotation.

FIG. 23 illustrates changes in the frequency band of the complex reception signal arising from normalization and phase rotation. In FIG. 23, the dashed-dotted line indicates the amplitude of the complex reception signal generated by the quadrature detector 61, the double-dotted line indicates the amplitude of the complex reception signal normalized by the normalizer 65, and the solid line indicates the amplitude of the complex reception signal phase rotated by the phase rotator 66. In FIG. 23, fLPF is the cutoff frequency of LPF 612.

To detect obstacles having complex shapes, such as vehicles and fences, it is desirable to reduce the signal width of the output of each of the correlation filters 62, 63, and 64 to improve the accuracy of code determination and height determination. The signal width can be reduced by increasing the frequency bandwidth of the reception signal.

A microphone used as the transducer 41 in the onboard sensor has a narrow band frequency characteristic. That is, when a microphone with such characteristics is used for the transducer 41, the transmit and receive sensitivity is high near the resonant frequency of the transducer 41, but at frequencies away from the resonant frequency, the transmit and receive sensitivity is low.

Thus, for example, when transmitting a chirp signal such that $f_c=f_0$ where $f_0$ is resonant frequency, the frequency component at or near the center frequency $f_c$ becomes larger while the frequency components at frequencies away from the center frequency $f_c$ become smaller. Only the components at or near the center frequency $f_c$ of the entire band can be fully utilized. Thus, the substantial bandwidth is narrowed, as indicated by the dashed-dotted line in FIG. 23, and the above signal width is increased. This may lead to an erroneous code determination when detecting obstacles with complex shapes. In addition, large differences in amplitude between signals $S_1$-$S_N$ with frequency may cause the result of correlation detection to be affected by the amplitudes near the resonant frequency $f_0$, leading to an erroneous determination of the code.

In contrast, the complex reception signal is normalized prior to correlation detection and the amplitudes of the signals $S_1$ to $S_N$ are made equal to each other, which can reduce the effect on the frequency characteristics of the microphone. As indicated by the double-dashed line in FIG. 23, the frequency band of the reception signal becomes broader. The normalized complex reception signal is further rotated in phase, such that the apparent frequency bandwidth becomes much broader, as indicated by the solid line. This can reduce the signal width of the correlation output and improve the accuracy of code determination and height determination.

The present embodiment can provide the same advantages as the first embodiment from the same configuration and operations as in the first embodiment.

According to the above embodiment, the following advantage can be provided.

(1) The complex reception signal is rotated in phase prior to correlation detection. This can reduce the signal width of the correlation output and improve the resolution of the reception signal, thereby improving the accuracy of code determination and height determination.

Fifth Embodiment

A fifth embodiment will be now described. The present embodiment is different from the first embodiment only in that the reference signals are changed. The other elements are similar as in the first embodiment. Thus, only differences from the first embodiment will be described.

As illustrated in FIG. 24, the second reference signal in the present embodiment is formed of a portion of the first reference signal whose frequency is lower than $f_c$, and the third reference signal is formed of a portion of the first reference signal whose frequency is higher than $f_c$. That is, the portion of the first reference signal whose frequency is at or near $f_c$ is excluded from both the second and third reference signals, and the maximum frequency of the second reference signal and the minimum frequency of the third reference signal are apart from each other.

The present embodiment can provide the same advantages as the first embodiment from the same configuration and operations as in the first embodiment.

According to the above embodiment, the following advantage can be provided.

(1) The difference in frequency between the second and third reference signals is larger than in the first embodiment. The greater this difference in frequency, the greater the difference in directivity, which can improve the accuracy of height determination.

Other Embodiments

The present disclosure is not limited to the embodiments described above, and the embodiments may be changed as appropriate. Each of the above embodiments is not unrelated to one another and can be combined as appropriate, except when the combination is clearly not possible. Needless to say, in the embodiments, the elements constituting the embodiments are not necessarily essential unless the elements are specified to be essential or the elements are considered to be apparently essential in principle.

The transducer 41 forming the transmitter 40A and the transducer 41 forming the receiver may be provided separately.

The frequency range of the second reference signal and the frequency range of the third reference signal may overlap in part.

In the third to fifth embodiments, the correlation filters 62, 63, and 64 may share a multiplier as in the second embodiment. In the fourth embodiment, the frequency of the reference signal may be corrected as in the third embodiment.

As illustrated in FIG. 25, in the fifth embodiment, the frequency of the reference signal may be corrected as in the third embodiment. In the fifth embodiment, normalization and phase rotation of the complex signal may be performed as in the fourth embodiment.

Figure 26:
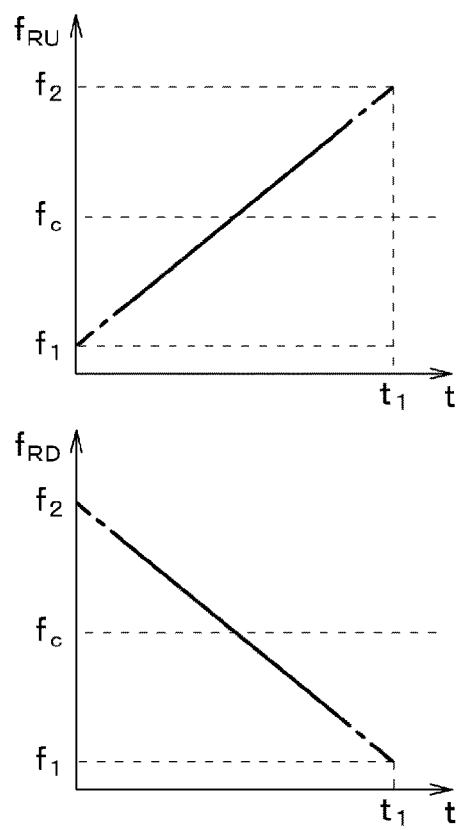
FIG. 26 is an illustration of frequencies of reference signals according to another embodiment.

As illustrated in FIG. 26, the bandwidth of the first reference signal may be narrower than that of the drive signal. Since components at both ends of the frequency band in the reception signal have low S/N, the accuracy of code determination can be improved by excluding the corresponding portion from the reference signal as illustrated in FIG. 26.

The second and third reference signals may partially share the bandwidth with the first reference signal. For example, the first reference signal shown in FIG. 26 and the second and third reference signals shown in FIG. 24 may be used. This thereby can improve the accuracy of height determination as in the fifth embodiment.

Figure 27:
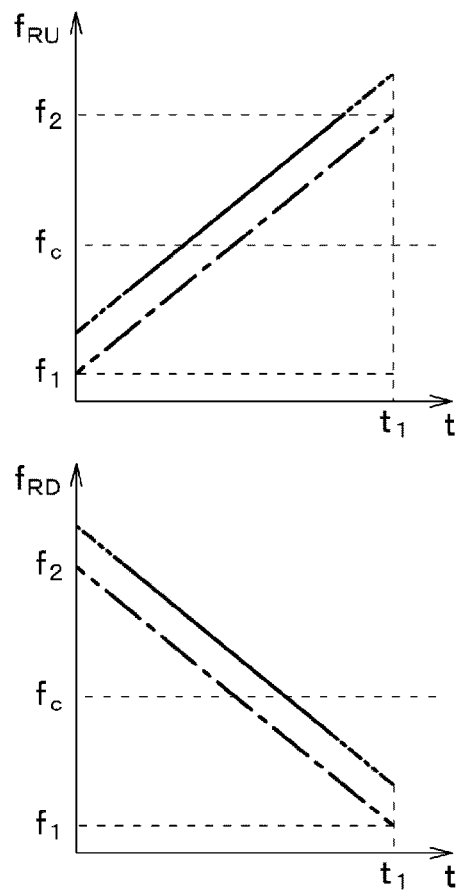
FIG. 27 is an illustration of frequencies of reference signals according to another embodiment.

As illustrated in FIG. 27, the frequency of the reference signal in FIG. 26 may be corrected as in the third embodiment.

As illustrated in FIG. 28, an FSK signal, in which a signal of frequency $f_1$ and a signal of frequency $f_2$ are repeated alternately, may be used as the drive and reference signals. FSK is an abbreviation for Frequency Shift Keying. The f R in FIG. 28 is the frequency of the first reference signal. In the first embodiment, the correlation filter 62 consisted of two filters, one for the up-chirp and the other for the down-chirp. Alternatively, in the case where such a driving signal is used, the correlation filter 62 consists of one filter and performs correlation detection between the first reference signal and the reception signal as illustrated in FIG. 28. The second reference signal consists of the portion of the first reference signal having a frequency of $f_1$, and the third reference signal consists of the portion of the first reference signal having a frequency of $f_2$.

As illustrated in FIG. 29, an FSK signal having four frequencies may be used as the drive and reference signals. In FIG. 29, there is a signal having a frequency of $f_2$, a signal having a frequency higher than $f_1$ and lower than $f_c$, a signal having a frequency higher than $f_c$ and lower than $f_2$, and a signal having a frequency of $f_1$, in this order. In this case, for example, the second reference signal consists of the second and fourth of these four signals, and the third reference signal consists of the first and third signals.

In each of the above embodiments, the reference signal output by the drive signal generator 5 is used. Alternatively, a reference signal corresponding to settings of the drive signal generator 5, calculated and recorded in advance, may be used.

The method of correlation calculation is not limited to the method of performing vector rotation and summation of the complex reception signal based on the reference signal. For example, a method of converting the complex reception signal into an amplitude r and phase θ of a vector and calculating the phase difference ΔO from the phase of the reference signal may be used.

The method of correlation calculation is not limited to the method of calculating the correlation after converting the reception signal to a complex reception signal through quadrature detection. Alternatively, for example, correlation calculation may be performed using a correlation function between the reception signal and the reference signal. The calculated correlation signal may be converted to an amplitude, thereby acquiring a filter output.

Calculation of the correlation function may be performed using FFT, where FFT is an abbreviation for Fast Fourier Transform.

In the above-described embodiments and modifications, the drive signal generator, the reception signal processor, the reference signal processor, the code determiner, the height determiner, the controller and their methods described in the present disclosure may be implemented by a dedicated computer including a processor and a memory programmed to execute one or more functions embodied by computer programs. Alternatively, the drive signal generator, the reception signal processor, the reference signal processor, the code determiner, the height determiner, the controller and their methods described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

What is claimed is:

1. An object detection device for detecting an object by transmitting and receiving ultrasonic waves, comprising:
   a transmitter that transmits an ultrasonic wave as a probe wave;
   a drive signal generator that generates a drive signal, including frequency modulation, to drive the transmitter;
   a receiver that receives the ultrasonic wave and generates a reception signal according to the received ultrasonic wave;
   a first correlation filter that performs correlation detection between the reception signal and a first reference signal corresponding to the drive signal and outputs a correlation signal;
   a first determiner that determines, based on the correlation signal output from the first correlation filter, whether the ultrasonic wave received by the receiver is a reflected wave of the probe wave transmitted from the transmitter;
   a second correlation filter that outputs a correlation signal by performing correlation detection between the reception signal and a second reference signal, the second reference signal being a signal corresponding to a portion of the drive signal;
   a third correlation filter that outputs a correlation signal by performing correlation detection between the reception signal and a third reference signal, the third reference signal being a signal corresponding to another portion of the drive signal having higher frequencies than the second reference signal; and
   a second determiner that determines whether there is an object within a detection region based on the correlation signal output from the second correlation filter and the correlation signal output from the third correlation filter.

2. The object detection device according to claim 1, wherein
   a time interval of the correlation signals used by the second determiner for the determination is set based on the correlation signal output from the first correlation filter.

3. The object detection device according to claim 2, wherein
   the time interval of the correlation signals used by the second determiner for determination is set based on a point in time when the correlation signal output from the first correlation filter peaks.

4. The object detection device according to claim 1, wherein
   the first correlation filter comprises a first correlation calculator that calculates a correlation between the reception signal and the first reference signal,
   the second correlation filter comprises a second correlation calculator that calculates a correlation between the reception signal and the second reference signal, and
   the third correlation filter comprises a third correlation calculator that calculates a correlation between the reception signal and the third reference signal, wherein
   the first correlation calculator, the second correlation calculator, and the third correlation calculator share calculation circuitry that performs correlation calculation.

5. The object detection device according to claim 1, wherein
   the drive signal comprises an up-chirp signal whose frequency increases monotonically with time or a down-chirp signal whose frequency decreases monotonically with time.

6. The object detection device according to claim 1, wherein
   the frequency of the first reference signal is corrected according to a speed of a vehicle to which the transmitter and the receiver are mounted.

7. The object detection device according to claim 1, further comprising:
   a first phase rotator that rotates a phase of the reception signal; and
   a second phase rotator that rotates phases of the first reference signal, the second reference signal, and the third reference signal, wherein
   the first correlation filter performs correlation detection between the reception signal whose phase has been rotated by the first phase rotator and the first reference signal whose phase has been rotated by the second phase rotator, the second correlation filter performs correlation detection between the reception signal whose phase has been rotated by the first phase rotator and the second reference signal whose phase has been rotated by the second phase rotator, and the third correlation filter performs correlation detection between the reception signal whose phase has been rotated by the first phase rotator and the third reference signal whose phase has been rotated by the second phase rotator.

\* \* \* \* \*